Oct. 13, 1925.
G. J. HUNTLEY
PACKAGING APPARATUS
Filed July 6, 1918    13 Sheets-Sheet 3
1,556,837
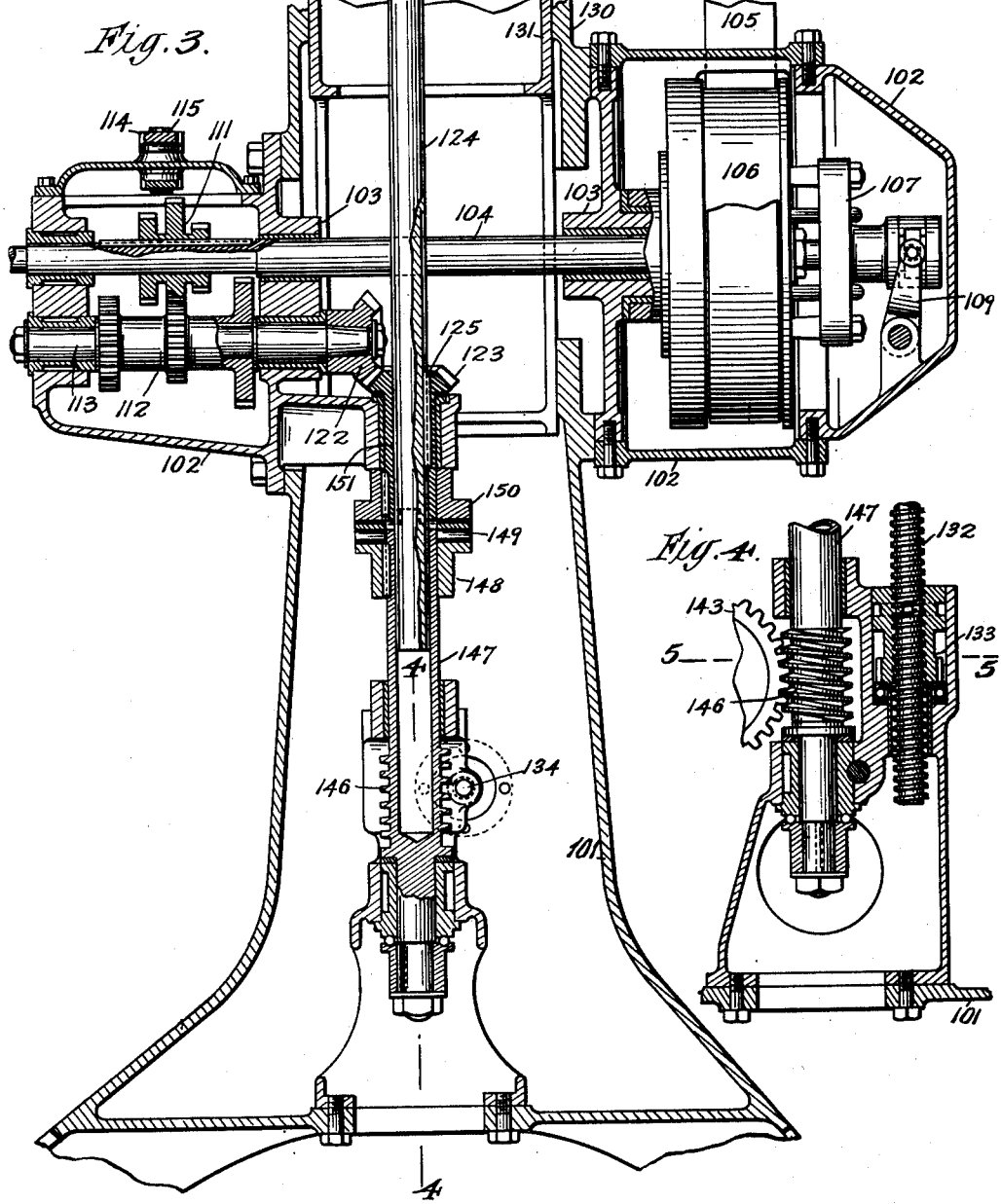
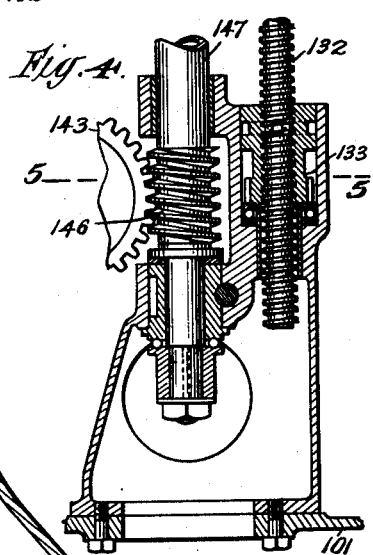
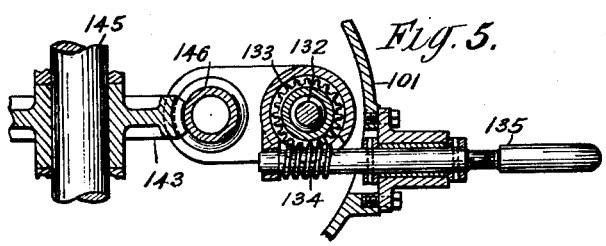

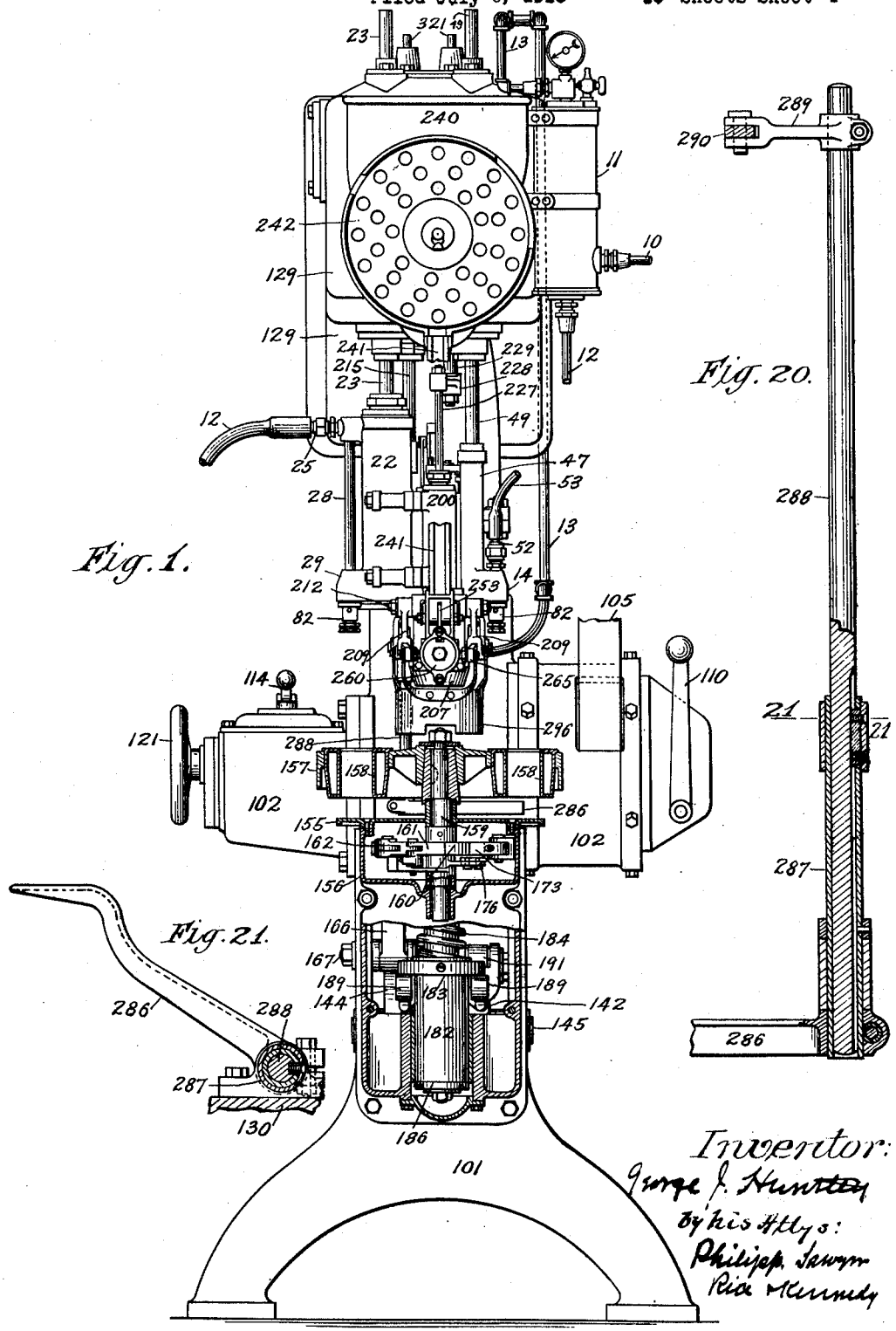

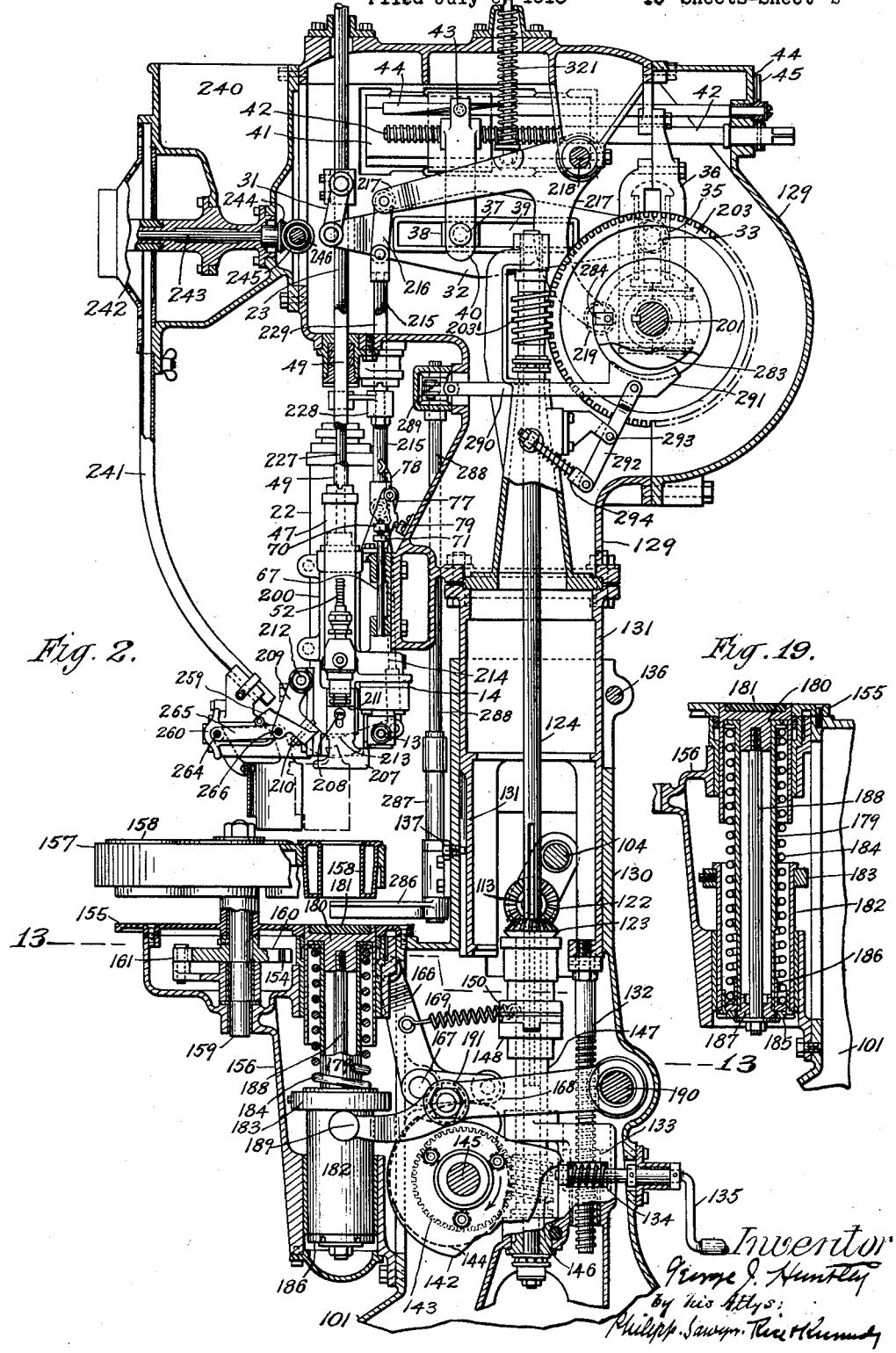

Oct. 13, 1925.
G. J. HUNTLEY
PACKAGING APPARATUS
Filed July 6, 1918 13 Sheets-Sheet 4
1,556,837
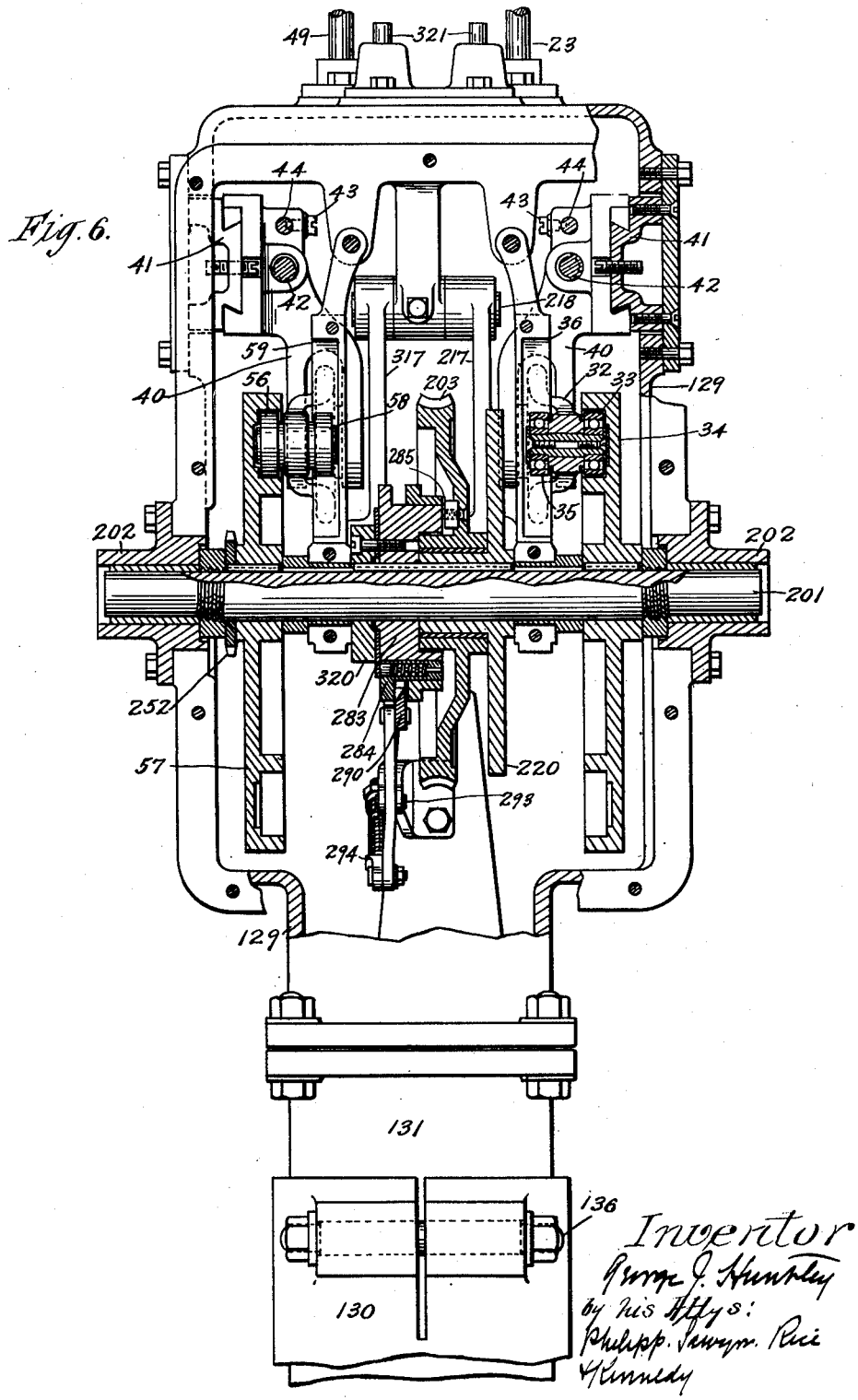

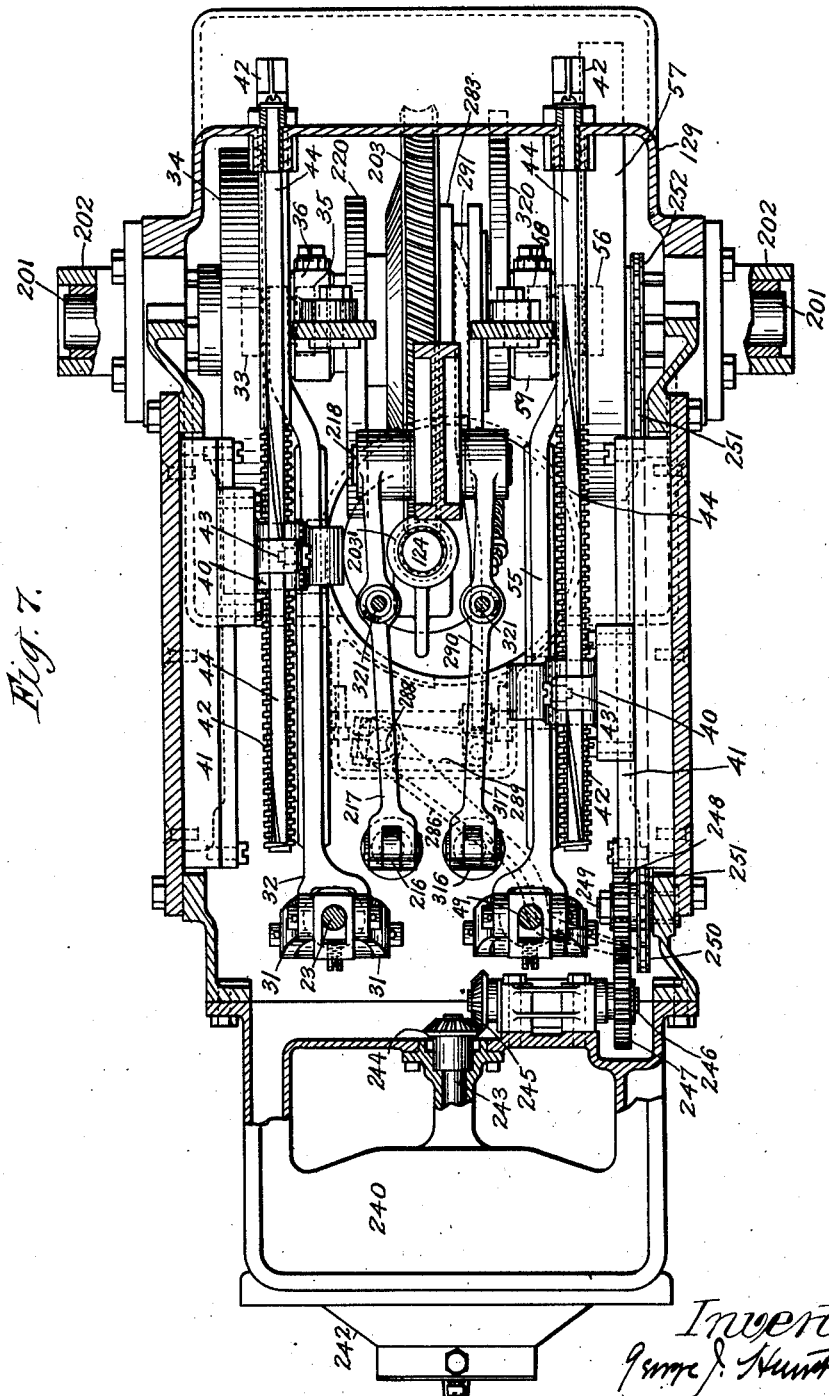

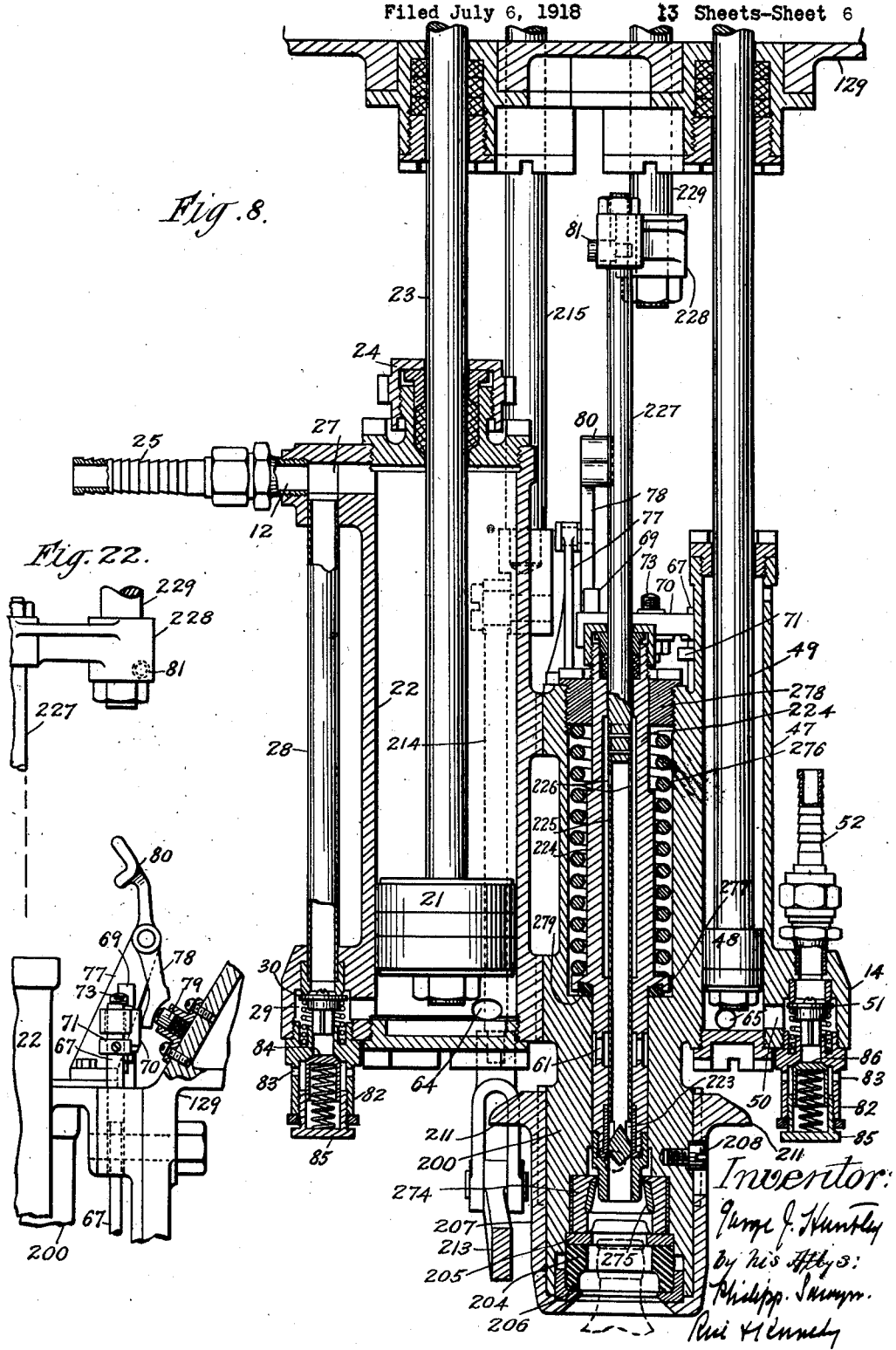

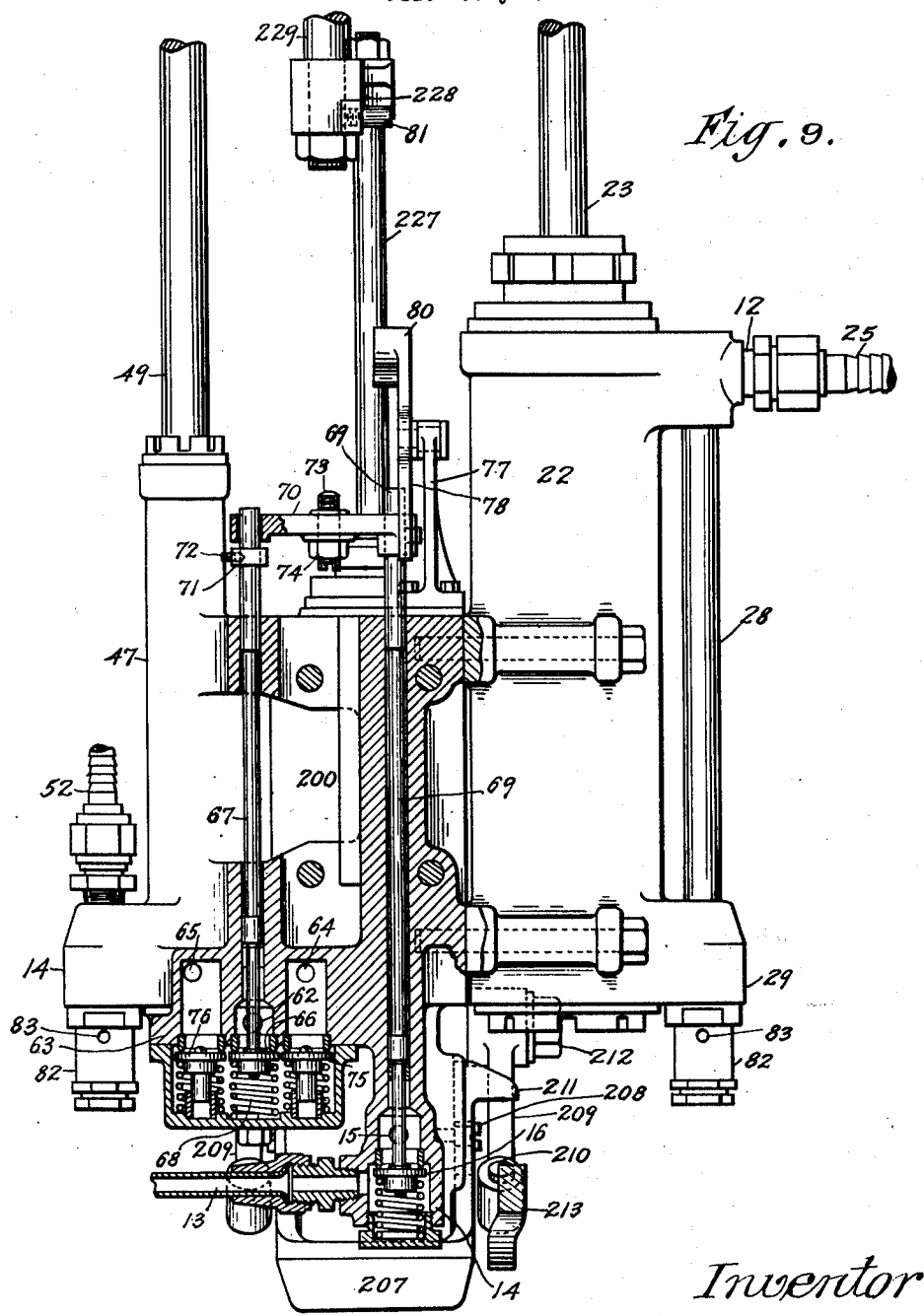

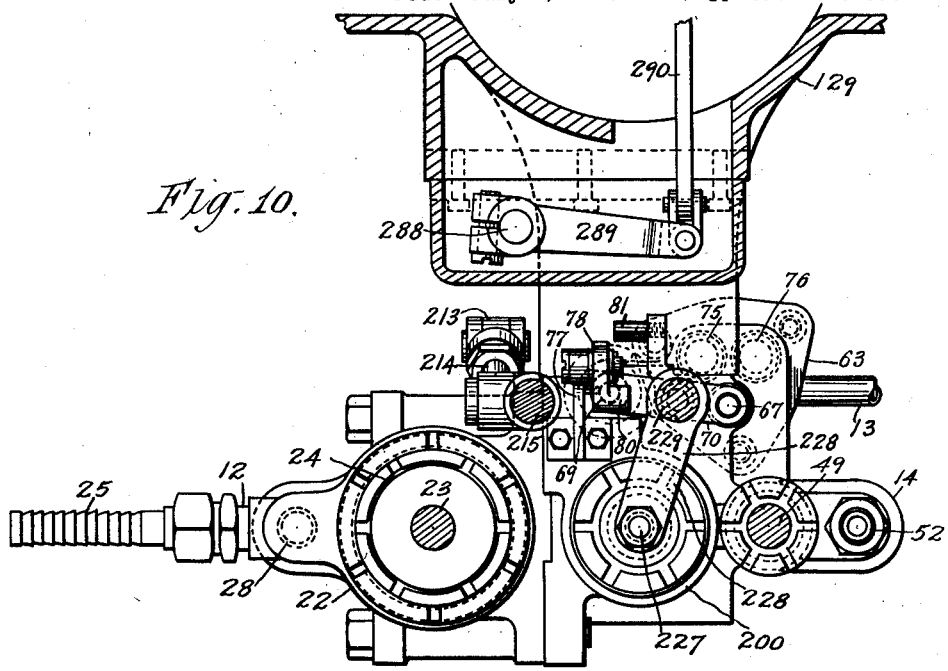
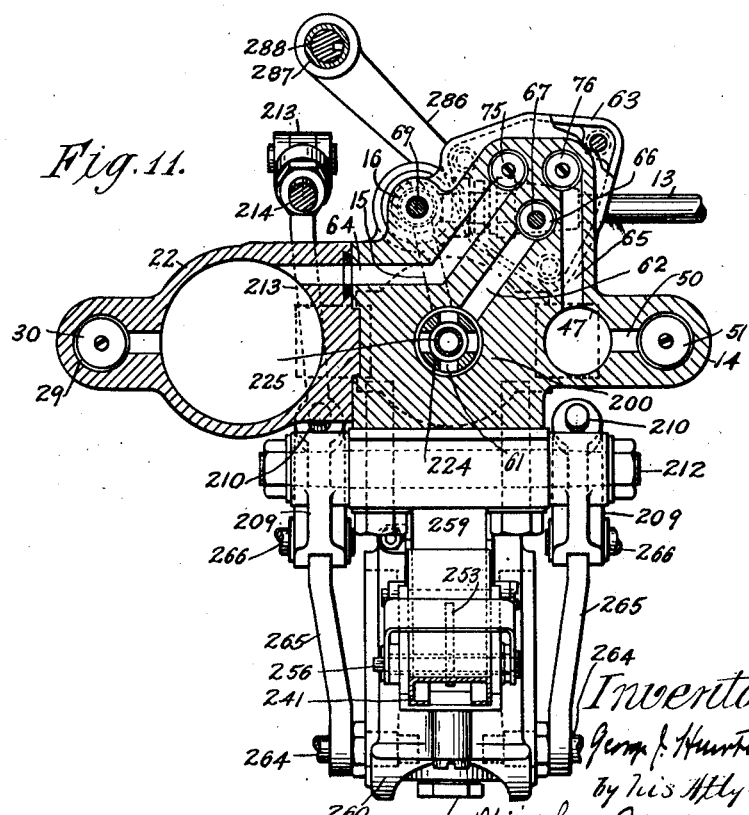

Oct. 13, 1925.

G. J. HUNTLEY

PACKAGING APPARATUS

Filed July 6, 1918 13 Sheets-Sheet 9

1,556,837

Inventor:
George J. Huntley
by his Att'ys:
Philipp, Sawyer, Rice & Kennedy

Oct. 13, 1925. 1,556,837
G. J. HUNTLEY
PACKAGING APPARATUS
Filed July 6, 1918 13 Sheets-Sheet 10

Inventor:
George J. Huntley
by his Attys:
Philipp, Sawyer, Rice & Kennedy

Oct. 13, 1925. 1,556,837
G. J. HUNTLEY
PACKAGING APPARATUS
Filed July 6, 1918 13 Sheets-Sheet 11
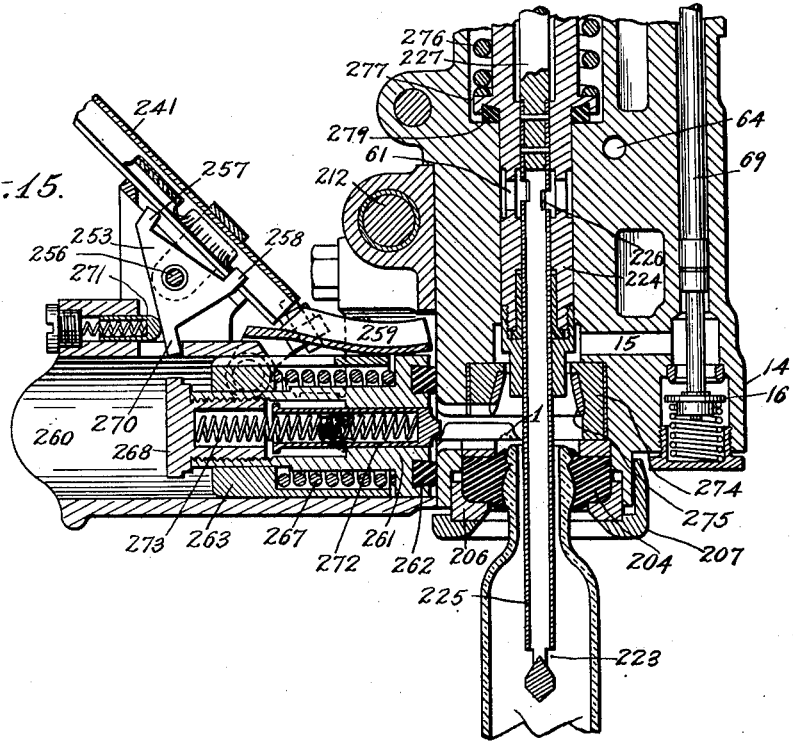
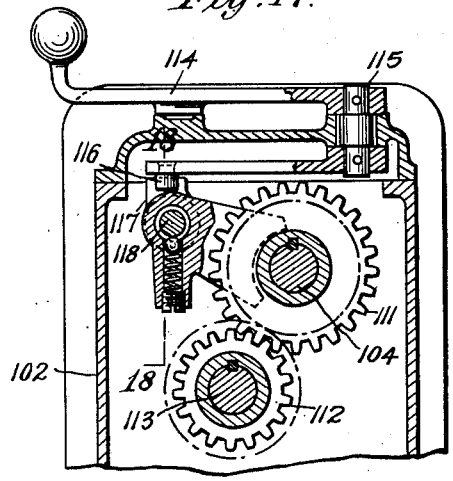
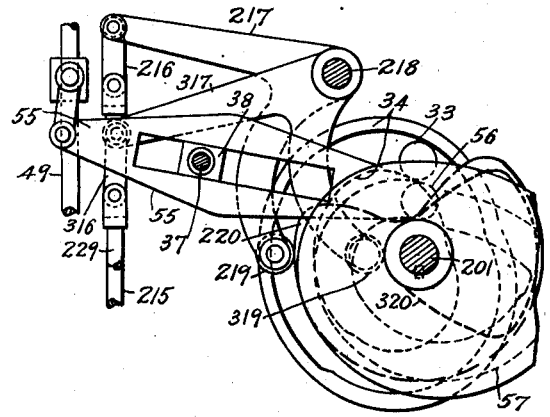
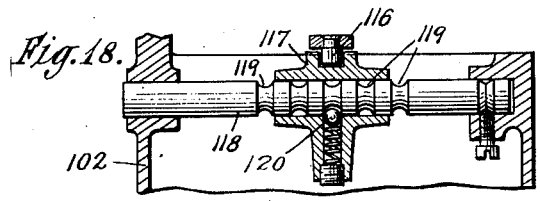
Inventor:
George J. Huntley
by his Attys:

Oct. 13, 1925.
G. J. HUNTLEY
1,556,837
PACKAGING APPARATUS
Filed July 6, 1918   13 Sheets-Sheet 12
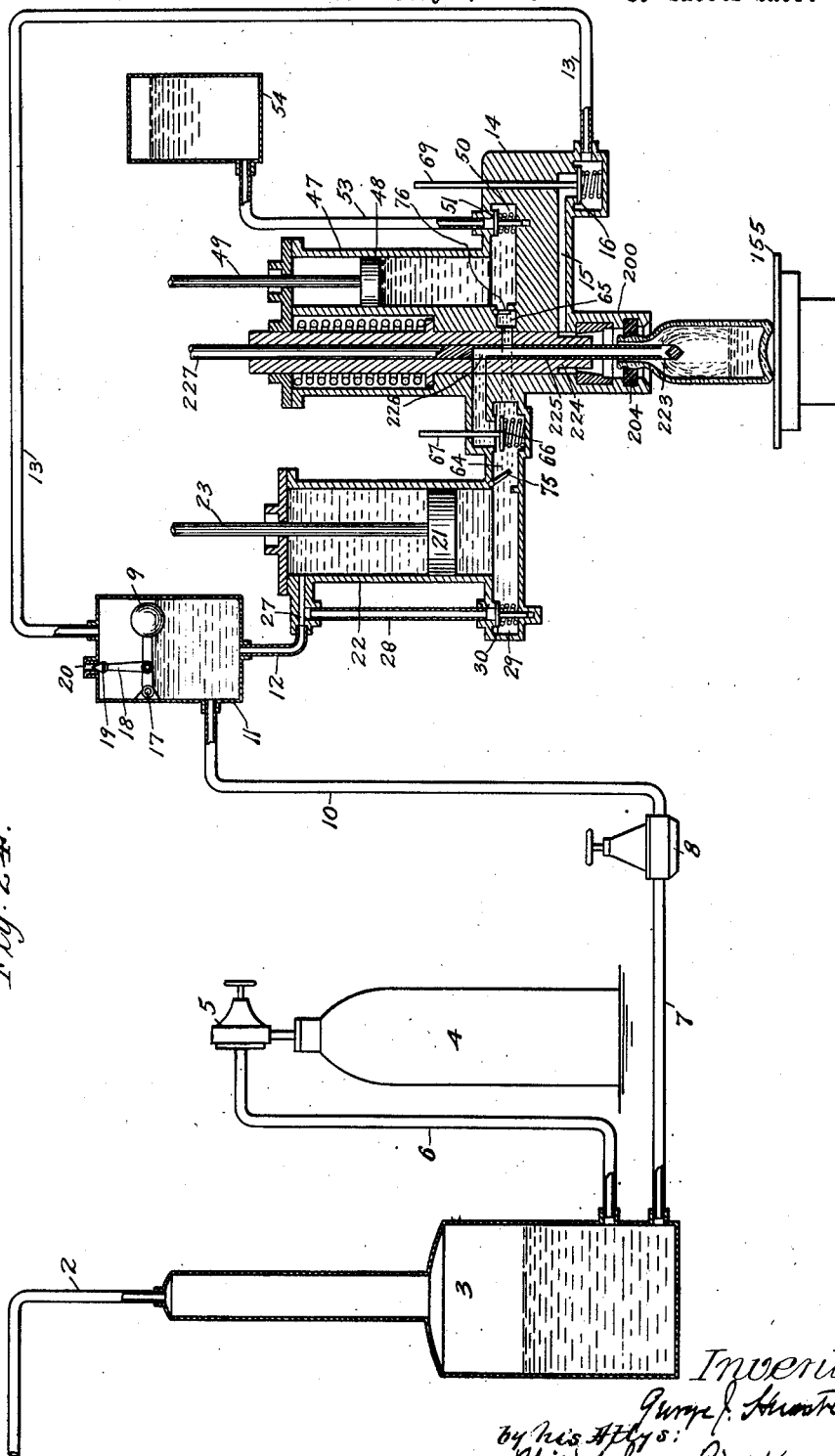

Oct. 13, 1925.
G. J. HUNTLEY
PACKAGING APPARATUS
Filed July 6, 1918 13 Sheets-Sheet 13
1,556,837
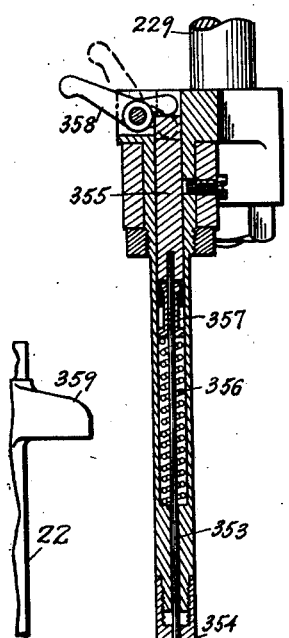
Fig. 27.
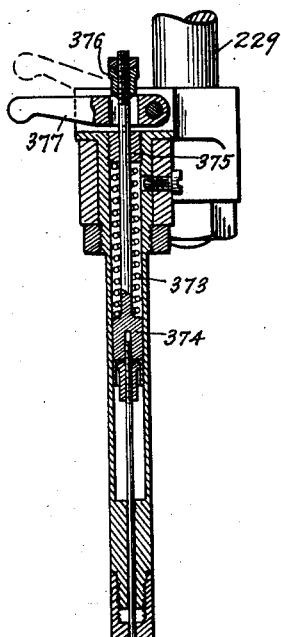
Fig. 29.
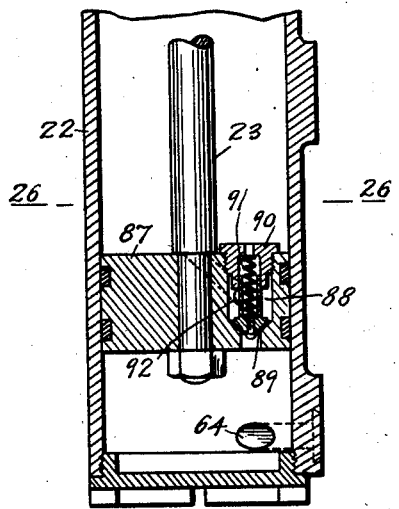
Fig. 25.
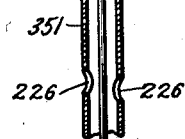
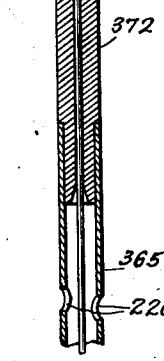
Fig. 28.
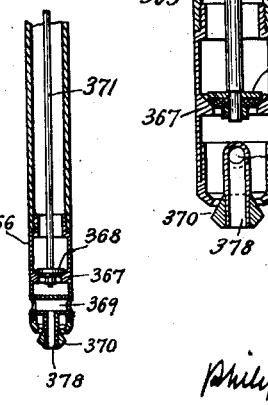
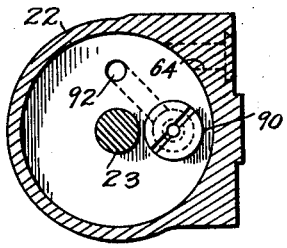
Fig. 26.
Fig. 30.
Inventor:
George J. Huntley
by his Attys:
Philipp, Sawyer, Rice & Kennedy Patented Oct. 13, 1925.

1,556,837

UNITED STATES PATENT OFFICE.

GEORGE J. HUNTLEY, OF BALTIMORE, MARYLAND, ASSIGNOR TO THE CROWN CORK AND SEAL COMPANY OF BALTIMORE CITY, A CORPORATION OF MARYLAND.

PACKAGING APPARATUS.

Application filed July 6, 1918. Serial No. 243,652.

*To all whom it may concern:*

Be it known that I, GEORGE J. HUNTLEY, a British subject, residing at Baltimore, in the State of Maryland, have invented certain new and useful Improvements in Packaging Apparatus, fully described and represented in the following specification and the accompanying drawings, forming a part of the same.

This invention relates to packaging apparatus and particularly to that type of packaging apparatus known as soda machines. Such machines ordinarily serve to fill bottles or similar receptacles with a charge of syrup or the like and a charge of carbonated water and to apply a closure to the filled bottle.

Soda machines as heretofore known have been subject to certain disadvantages. For example, their operation has been attended with a loss of gas through snifting and a loss of syrup through foaming. Further, the control of the quantity of liquid delivered has been uncertain as the quantity has depended on some such element as the rate of speed of operation, or the size of the bottle presented. Also there has been more or less loss of bottles by breakage due to an excessive gas pressure for a given degree of carbonation.

It is the principal object of the present invention to provide a packaging apparatus of the type mentioned that reduces the loss of gas and syrup to a minimum; that delivers uniform measured quantities of liquid regardless of the rate of speed of operation or the size of bottle presented; that makes possible the packaging of a highly carbonated product with little loss by breakage and that is capable of high speed operation.

With this general object and other objects and advantages, which will be obvious to those skilled in the art, in view, the invention consists in the features, details of construction, arrangements of parts and combinations which will first be described in connection with the accompanying drawings and then more particularly pointed out.

In the drawings—

Fig. 1 is a view in front elevation with parts in vertical cross-section of a soda machine embodying the invention.

Fig. 2 is an enlarged vertical cross-section of the same.

Fig. 3 is a view similar to Fig. 2, showing the lower part of the machine, the section being taken on a different plane;

Fig. 4 is a cross-sectional view, taken through the line 4—4 of Fig. 3.

Fig. 5 is a similar view, taken through the line 5—5 of Fig. 4;

Fig. 6 is a view in rear elevation with parts broken away and parts in vertical section;

Fig. 7 is a top plan view with parts broken away and removed;

Fig. 8 is a vertical cross-sectional view showing the capping and filling head and the water and syrup pumps;

Fig. 9 is a view in rear elevation with parts broken away showing the valve control;

Fig. 10 is a horizontal sectional view taken above the pumps;

Fig. 11 is a similar view through the valve chest;

Fig. 15 is a similar view showing the parts in sealing position;

Fig. 17 is a vertical sectional view taken through the change speed gear dogs;

Fig. 18 is a sectional view taken on the line 18—18 of Fig. 17;

Fig. 19 is a vertical cross-sectional view through the compensating mechanism;

Fig. 20 is an enlarged view, partly in elevation, and partly in section, of a portion of the device for controlling the upper cam shaft clutch;

Fig. 21 is a sectional view taken on the line 21—21 of Fig. 20;

Fig. 22 is a detail view in elevation with parts in section of the valve locking mechanism.

Fig. 23 is a view in elevation of the upper cam group;

Fig. 24 is a diagrammatic view of the apparatus;

Fig. 25 is a vertical cross-sectional view showing a modified form of piston;

Fig. 26 is a cross-sectional view taken on the line 26—26 of Fig. 25;

Fig. 27 is a vertical cross-sectional view showing a modified form of nozzle;

Fig. 28 is a similar view showing in detail a portion of the same nozzle;

Fig. 29 is a view similar to Fig. 27 showing a further modification, and

Fig. 30 is a vertical cross-section (enlarged) of the lower portion of the nozzle, shown in Fig. 29.

Figure 12:
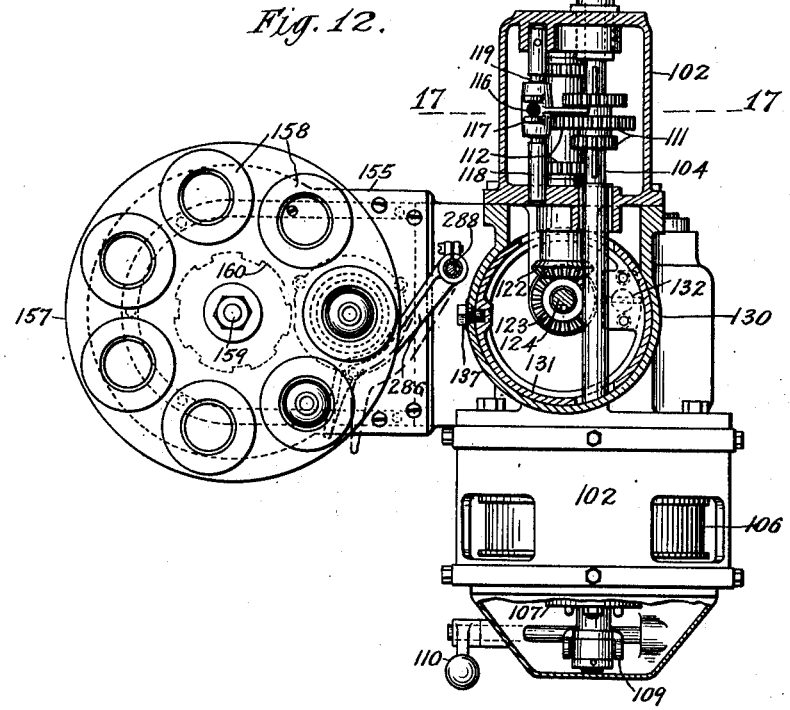
Fig. 12 is a horizontal sectional view taken above the bottle feed dial.
Figure 13:
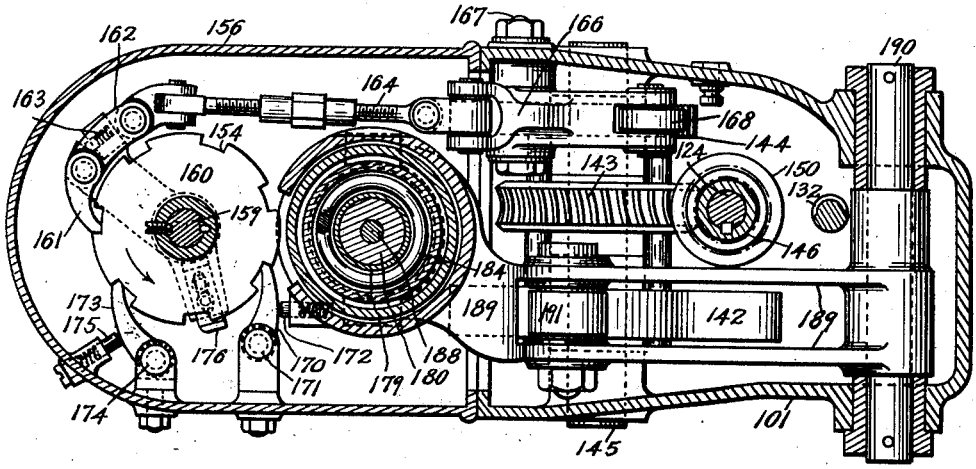
Fig. 13 is a sectional view taken on the broken line 13—13 of Fig. 2.

Referring to the drawings, the machine illustrated as an example is supported by a standard 101 to which is secured a housing 102 which provides bearings 103 for a power shaft 104. Power is derived in any suitable manner, as, for example, by a belt 105 running over a pulley 106 which carries a clutch member (not shown) of the expanding ring type. Cooperating with the clutch member carried by the pulley is a complementary clutch member 107 which is slidably keyed to the power shaft 104 and is operated by a yoke 109 and control handle 110. The construction here shown is arranged to be operated at different speeds. To this end, on the power shaft is slidably keyed a gang gear 111 which, in the present instance, comprises three pinions. Each of these pinions is designed to mesh with a complementary pinion on the gang gear 112 on the shaft 113. The gang gear 111 is shifted to vary the speed of the machine by means of a lever 114, shaft 115 and block 116 (Figs 17 and 18) which engage a yoke 117 slidable on a shaft 118. To properly locate the gear shifting apparatus, this shaft 118 has a plurality of circumferential grooves 119 arranged to engage a spring pressed dog 120, carried by the yoke. The dog 120 also serves to prevent creeping of the gang gear. To facilitate gear changing and for setting the machine the drive shaft 104 carries at its outer end a hand wheel 121. On the shaft 113 is a bevel pinion 122 meshing with a similar gear 123 keyed to a vertical drive shaft 124 by keys 125, this connection being arranged to permit the vertical drive shaft 124 to slide with respect to the bevel gear 123 when the position of the apparatus is adjusted for bottles of different size, as hereafter described.

There is provided a packaging head and a bottle support capable of relative movement to assemble head and bottle in filling relation and capping relation. In the apparatus illustrated as an example the bottles are filled and capped by a relatively stationary packaging head 200 carried by a frame or housing 129, the bottles, fed across a relatively stationary table onto an elevating table, being elevated to and withdrawn from this head. In order that the machine may be adapted to bottles of different size. i. e., quarts, pints, and the like, the filling and capping head with its associated parts is bodily movable with respect to the relatively stationary parts. As here shown, sliding in the tubular portion 130 of the base 101 is a column 131 to which the housing 129 is secured. This column is bolted or otherwise attached to a rod 132, threaded through a nut 133 having, on its periphery teeth meshing with a worm 134 which is rotated by a handle 135. Operation of this handle raises or lowers the rod 132, thereby raising or lowering the column 131 and housing 129, which carries the filling and capping head. The column is locked in its adjusted position by means of a clamping bolt 136 and rotation of the column is prevented by a pin 137 riding in a suitable groove formed in the column.

The apparatus here illustrated as an example comprises what may be designated as six major mechanisms; the bottle feed, the bottle elevating mechanism, the gasket sealing mechanism, the nozzle moving mechanism, the water pump and the syrup pump. These, in the present embodiment, are divided into two groups, the bottle feed and bottle elevating mechanism forming one group which is carried by the base, the other four forming the second group which is carried by the adjustable frame or housing 129. The bottle feeding and elevating mechanisms are actuated by cams forming what may be termed a lower cam group. This group comprises a bottle elevating cam 142, a worm wheel 143 and a bottle feeding cam 144, these three parts being bolted or otherwise secured together as a unit, and rotatable on a stationary shaft 145. Meshing with the worm wheel 143 is a worm 146 formed on or secured to shaft 147 which is driven through a suitable connection, by the bevel gear 123. As here shown, in order that proper alignment may be made, this connection comprises the Oldham coupling 148, 149, 150, the lowest member 149 of this coupling being secured to shaft 147, and the upper member 150 being keyed to a sleeve 151 formed as part of the bevel gear 123. With this construction the drive above described rotates the bottle elevating cam and the bottle feed cam.

Means is provided for feeding bottles one after another to a position beneath the filling and capping head by a step by step movement. In the embodiment illustrated, the bottles are supported on a stationary table 155 carried by a bracket 156 and are moved into position by a bottle dial 157. This dial has a plurality of spaced sockets adapted to receive bottle-embracing bushings 158 which are interchangeable, the bushing used being adapted for the particular size and shape of bottle being filled. The dial 157 is secured to a vertical shaft 159 having bearings in the table 155 and bracket 156. Secured to this shaft 159 is a ratchet wheel 160 having a plurality of spaced notches 154 adapted to be engaged by a drive pawl 161. This drive pawl is reciprocated by a rocker lever 162 and is held to its duty by a spring 163. The rocker lever is connected by means of connecting rod 164 with a lever 166 pivoted on a stud 167 and carrying at its other end a cam roller 168 which rides on the bottle feed cam 144. The roller is held to the cam by means of a spring 169. As the bottle feed cam rotates, the pawl is operated to drive the ratchet forward with a step by step movement, thus giving a similar movement to the bottle dial.

There is provided means for locking the bottle feed mechanism against movement in either direction, and in constructions embodying the invention to the best advantage, this is accomplished by locking the ratchet between its successive feeding movements. Although capable of various constructions, in the present embodiment, the ratchet is at all times locked against backward movement by a pawl 170 pivoted to a stud 171 and yieldingly held against the ratchet by a spring pressed pin 172. The ratchet is locked against forward movement between its bottle feeding movements by a similar pawl 173 pivoted on a stud 174 and held against the ratchet by a spring pressed pin 175.

Means is provided for releasing locking pawl 173 at the proper time to permit the drive pawl to advance the ratchet on its bottle feeding stroke. As here shown, the rocker lever 162 carries a wiper 176 which, as the drive pawl makes its backward stroke, lifts the locking pawl out of engagement with the ratchet notch. As a result, on the forward stroke of the drive pawl the ratchet is free to be moved forward one stroke, whereupon the locking pawl drops into the next notch. As will be apparent, during this forward movement of the ratchet the other locking pawl merely rides over the ratchet until the next notch is reached, into which it drops and thus the ratchet is again locked against movement in either direction. The construction described provides a bottle feed such that there is no liability of any movement of the bottle during the filling and capping operations.

The bottles thus successively fed to position beneath the filling and capping head are, in the present embodiment, raised to the head by two movements, so that the bottle takes one position for filling and is further raised for the capping operation. As hereinafter described, the capping plunger is arranged to allow a bottle to enter the throat a given distance and the elevating mechanism is such that it may yield, or compensate in proportion to the height of the bottle presented. As here shown, beneath the filling head, the stationary table 155 is cut away to receive a bottle elevating table 180 having a seating pad 181, the top of this table being normally flush with the stationary table so as to receive the bottle advanced by the feed dial. Sliding in the bracket 156 is a sleeve or casing 182 to which is secured a collar 183 (Fig. 19). Partly enclosed by this sleeve is a spring 184 which bears at the top against the shoulder of a tubular guide member 179 which engages the bottle elevating table 180. At the bottom the spring bears against a shouldered bushing 186 which is engaged below by a nut 185 threaded into and forming part of the sleeve 182. Threaded into the tubular member 179 is a nut 187 connected with the elevating table by a rod 188. The collar 183 is engaged by the yoked end of a lifting lever 189 pivoted as at 190, and having a cam roller 191 which rides on the bottle elevating cam 142. As the cam rotates, the movement of the lifting lever elevates the casing 182. As long as the pressure of the spring 184 exceeds the pressure encountered by the bottle, the elevating device moves as a unit, the table 180 being lifted by the engagement of the nut 185 against the bushing 186 and the force of the spring. As soon, however, as the pressure on the bottle reaches the predetermined point the bottle table yields or in other words ceases its upward movement and the spring compresses to permit the further upward movement of the casing to the end of the lifting lever stroke. The cam 142 is designed to raise the bottle elevating table as soon as a bottle has been received thereon, first by a movement which lifts the bottle to filling position and, after a pause for filling, by a further stroke to lift it to capping position. For a given cam this combined stroke is always fixed. Minor variations in bottle heights are taken care of by the compensating mechanism described and the apparatus is adapted for bottles of different standard sizes by raising or lowering the head as described.

Since the bottles are being filled with liquid under pressure, means is provided for sealing the bottles in the filling head. Although capable of various constructions, as here shown, carried by the filling head is a compressible gasket 204 bearing at the top against an abutment ring 205 hereinafter referred to, and engaged about the bottom edge by an angle ring 206 carried by a slotted yoke 207 riding on the pins 208 which are carried by the head. This yoke is moved against the sealing gasket to contract the same by means of oscillating arms 209 carrying adjustable pins 210 arranged to engage lugs 211 on the yoke 207. The arms 209 are connected by a pivotal shaft 212 and one of them is provided with an extension 213 to which is secured a rod 214 reciprocated by a plunger 215. This plunger is connected by a link 216 with a rocker lever 217 pivoted on a cross shaft 218 and having a cam roller 219 riding on a cam 220. This cam is keyed to a shaft 201 journaled in bearings 202 carried by the housing 129 and rotated as later described. Rotation of the cam 220 causes the arms 209 to alternately move the compressing yoke to contract and release the sealing gasket.

In the embodiment of the invention illustrated both water and syrup are conveyed to the bottle by a nozzle connected with the two sources of supply, this nozzle being introduced into the bottle for the filling operation. The nozzle illustrated in Fig. 8 comprises a tube 225 sliding in a capping plunger 224, later referred to. This tube is provided, near its upper end, with inlet ports 226 and at the bottom with discharge ports 223 arranged to discharge the liquid into the bottle with a minimum amount of disturbance. To lower and raise the nozzle to and from the bottles the tube 225 is secured to a reciprocating rod 227 connected by a cross piece 228 with a plunger 229, operated, for example, by mechanism similar to that which operates the gasket controlling plunger. As shown, the plunger 229 is connected by a link 316 with a rocker lever 317 pivoted on the cross shaft 218. The rocker lever 317 carries a cam roller 319 which rides on a cam 320 driven by the cam shaft 201 by being secured to a clutch member later referred to. Rotation of the cam 320 causes the nozzle to be alternately lowered into and raised from the bottle presented.

The rocker levers 217 and 319 are held to their duty by spring pressed rods 321 which yield in case the nozzle, on its downward stroke should chance to encounter a bottle already capped, or other obstruction opposing its full stroke.

There is provided means for establishing in the bottles to be filled, a counter pressure during at least a portion of the filling operation. This counter pressure may conveniently be substantially equal to the pressure of the carbonated liquid with which the bottle is to be filled. To this end, there is provided, as an example, container-means for carbonated liquid and for pressure fluid, and connections between the container-means and the bottle. While this may be accomplished in various ways, in structures embodying the invention to what is now considered the best advantage, there is provided a pressure line including a reservoir for carbonated water and free gas, and the bottle is made a part of this pressure line. The air displaced from the bottles filled, discharges into the pressure line, and to maintain a balance of pressure, the gaseous contents, i. e., air and free gas, are vented upon accumulation beyond a given point. Although capable of various constructions, in that here illustrated as an example, carbonated water and free gas are delivered as hereinafter described by a pipe 10 to a reservoir formed by a container or tank 11. This reservoir has a water delivery pipe 12 leading from the bottom thereof, and from the upper portion thereof is a counter pressure connection with the bottle, comprising a pipe 13, valve chest 14 and duct 15, the last opening into the filling head. This connection is normally closed by a spring pressed valve 16 in the valve chest 14. After a bottle has been sealed in the head, the valve is opened as later described, and the bottle is thus made part of the pressure line.

In the reservoir 11 is a float 9 pivoted as at 17 and carrying a spindle 18 on which is a vent valve 19 seating in a vent port 20 formed in the top of the reservoir tank. Valve 16 being closed, the water and free gas enter the reservoir and the water raises the float until the vent valve closes. Thereafter the flow continues until the pressure of the gas in the line substantially equals the pressure of the carbonated water. When water is withdrawn from the reservoir as hereinafter described, and delivered to the bottles presented for filling, the displaced air from the bottles discharges into the counter pressure connection and a new supply of water and free gas flows into the reservoir until the pressure of the free gas and air balances the water pressure and again stops the flow. Should the pressure of the gaseous matter (i. e., air and free gas) reach a given point, the water level recedes sufficiently to lower the float and open the vent valve. This vents the excess gas and air and the inflowing water raises the float to close the valve again. Thus the accumulated air is positively vented upon exceeding a given amount and the balance of pressure is maintained in the pressure line without permitting the relative proportion of water to drop below a given minimum.

There is provided means whereby the pressure line is supplied with free gas and with carbonated water at a minimum pressure for a given degree of carbonation. As here shown as an example, water from any suitable source flows by pipe 2 to a carbonator 3, which may be of any suitable construction. The carbonator receives gas from a drum 4 through control valve 5 and pipe 6. From the carbonator a pipe for the carbonated water leads to a reducer valve 8 from which the delivery pipe 10 leads to the reservoir. The ordinary carbonator is not 100% efficient and consequently the carbonated product holds an excess of gas. The reducer valve 8 is set to remove substantially all of the excess gas. From the valve the water and freed gas pass to the reservoir. Thus the water supplied for delivery to the bottles has a minimum pressure for the degree of carbonation and the removed gas is utilized in building up the counter pressure in the pressure line.

There is provided means for forcing the carbonated liquid into the bottles to be filled, and provision is further made for doing so with a given effective force. This may be accomplished for example, by an impeller working in a cylinder or the like. In the embodiment here shown, an impeller or pump is provided comprising a piston 21 reciprocating in a chamber or cylinder 22, and secured to a piston rod 23 sliding in a stuffing box 24. This pump is connected with the reservoir and the bottle so as to draw water from the reservoir on its suction stroke and to force the water into the bottles on the impelling stroke. To this end, as here shown as an example, a nozzle 25 (Fig. 8) connected with the reservoir in any suitable manner as by pipe 12, opens into a passage 27 formed near the top of the cylinder. This passage is connected by a pipe 28 with a chamber 29 formed near the bottom of the cylinder and communicating therewith. In the chamber 29 is a spring pressed check valve 30 arranged to open on the suction stroke and to be closed on the impelling stroke of the piston. The passage 27 also communicates with the cylinder 22, water being admitted above the piston to partially balance the pressure thereon during the impelling stroke. The connection from the pump cylinder to the bottle is later described.

Means is provided for reciprocating the piston with a given stroke. Although capable of various constructions, as here shown, the piston rod 23 is connected by a link 31 with a rocker lever 32. This latter member carries a cam roller 33 which rides on a cam 34, driven by the upper cam shaft 201. Rotation of the cam oscillates the rocker lever to reciprocate the piston rod. In order that the lever may have a vertical movement it is provided with a second roller 35 riding in a bracket 36.

There is provided means whereby the piston stroke is given a varying speed which is slower at the end of the stroke than at the start. With the piston operating means just described, this speed variation is controlled by the cam design. In the present embodiment the cam 34 is so laid out that the piston is given a relatively rapid movement at the start, the speed gradually diminishing. With such a construction, the flow of water into the bottle is rapid at first when there is room for splashing, but slows up as the bottle fills so that the loss of liquid by splashing is greatly reduced without loss of time in filling.

With the construction described, the amount of liquid delivered by the pump is a function of the length of stroke of the piston and uniform charges are delivered to successive bottles regardless of the speed of operation or variation in the size of the bottles. Apparatus embodying the invention in its entirety, however, is adapted to fill bottles of different sizes, as, for example, quarts, pints and splits. To vary the uniform charges delivered, therefore, means is provided for adjusting the stroke of the piston to suit the size of bottles being filled, or in other words, to vary the quantity delivered as may be desirable. As here shown, the pump piston has a neutral or zero position midway of the cylinder and its stroke either way therefrom is varied by varying the effective stroke of the operating mechanism. When operating means such as that described is utilized, means may be provided for shifting the pivot on which the lever rocks. This varies the stroke of the driving end of the lever without affecting the stroke of the cam driven end. In the present embodiment, the lever rocks on a pivoted pin 37 carried by a block 38 which is slidable in a slot 39 formed in the rocker lever. This block is carried by a yoke 40 which has a sliding support on a dove-tailed bracket 41. Through the yoke 40 is threaded an adjusting rod 42 which may be rotated in any suitable manner. It will be seen that rotation of the rod 42 will move the yoke along the bracket 41 thus shifting the pivot 37 on which the rocker lever swings.

Means is provided for indicating the adjustment for which the pump is set. Although capable of various constructions, as here shown, the yoke 40 carries a pin 43 which moves in a spiral groove on a rod 44 so as to rotate the same as the yoke moves. At the end of this rod 44 is a pointer 45 revolving over a dial 46 divided to show the adjustment in terms of ounces.

As before mentioned, the apparatus illustrated is of the type which delivers a quantity of "syrup" to the bottle. Means is provided for delivering syrup to the bottles in variable measured quantities in the same manner the water is delivered. In the apparatus shown this is accomplished by means similar to the water delivery means. The syrup impelling means comprises a cylinder 47 in which reciprocates a piston 48 on a piston rod 49. Opening out of the lower end of the cylinder is a passage 50 connecting through a check valve 51 with a nozzle 52 which is connected by pipe 53 with a source of supply 54. The piston 48 is reciprocated from a neutral position midway of the cylinder by mechanism which is a counterpart of the operating mechanism for the water pump. That is to say, the piston rod is linked to a rocker lever 55 carrying a cam roller 56 riding on a cam 57 driven by the upper cam shaft 201. The lever also carries a roller 58 riding on a guiding bracket 59. The mechanism for varying the stroke of the lever by shifting the pivot pin and for indicating the point of adjustment is a counterpart of the similar mechanism for the water pump and no further description is necessary.

There is provided means whereby a major portion of the water is delivered prior to the delivery of the syrup and after the syrup the remainder of the water is delivered. In the form of apparatus here shown this is accomplished by the cam design. The water and syrup cams are so laid out that after the water pump has made the major part of its stroke, a pause occurs while the syrup pump operates and then the water pump continus to the end of its stroke. By thus delivering syrup into the water, there is a reduction in foaming and the second and relatively small water charge serves to wash out any syrup in the passageway and nozzle. The cams are so arranged that the stream is unbroken during the changes of flow.

Provision is made for controlling the flow of liquid from the pumps to the nozzle. This may be accomplished for example, by having normally closed liquid connections and positively operated means for opening said connections at the proper time. In the embodiment here shown a common passage for water and syrup leads to the nozzle and the flow therethrough is controlled by a valve spring-pressed to be normally closed. To this end, the nozzle ports 226 are arranged to register, when the nozzle is in filling position, with a chamber 61 formed in the plunger 224. This chamber is in communication with a common delivery duct 62 leading from a valve chest 63. Water is received into the valve chest by way of a duct 64 leading from the bottom of the water pump cylinder 22, and syrup by way of a duct 65 leading from the bottom of the syrup pump cylinder 47. In the valve chest, to control the flow to the nozzle, is a liquid control valve 66 secured to a valve rod 67, normally held closed by a spring 68.

Means is provided for operating the valve rod to open the valve and in constructions embodying the invention to the best advantage, this operation is dependent on the position of the nozzle. That is to say, provision is made for causing the valve to open to permit the flow of liquid when the nozzle has reached the proper position in the bottle. Means is also provided for operating the gas controlling valve 16 so as to open the latter slightly in advance of the liquid control valve, and these two operations may be performed by the same means. As shown, for example, the valve 16 is actuated by a valve rod 69. This valve rod and the valve rod 67 are moved by an operating bar 70. This bar is secured to valve rod 69 and is slidable on valve rod 67. On the latter, in a position to be engaged by the bar, is a collar 71 adjustably secured in place by a set screw 72. It will be seen that movement of the bar causes movement of the valve rod 69 and that rod 67 will also be displaced as soon as the bar engages collar 71. The bar 70 is moved by the plunger 229 which reciprocates the nozzle, the bar carrying a pin 73 which is engaged by the end of the plunger 229 as the latter makes its downward stroke. Thus, as the nozzle takes filling position, the valves are opened, the gas control valve being opened sufficiently in advance to allow the bottle to attain its proper counterpressure prior to the admission of the liquid. Further, the operation is such that the valves are positively controlled, their opening taking place only after the nozzle has reached filling position in the bottle. Thus there can be no premature flow of gas or liquid. To perfect the timing as may be desirable, the pin 73 is made adjustable by being threaded through the bar 70. It is locked in position by a lock nut 74. The relative opening of the two valves may be timed by shifting the collar 71.

Since one pump is making a suction stroke while the other is making its impelling stroke, check valves are provided for the water and syrup connections. As shown, in the valve chest 63 is a spring pressed check valve 75 for controlling the water passage to the valve chest and a similar valve 76 for controlling the syrup passage.

These valves are arranged to be closed by their springs on the suction stroke of their respective pumps and opened by the force of the impelling stroke.

Means is provided for locking the liquid and gas control valves open. With the valve operating means just described it will be apparent that the valve rods are held down as long as the nozzle plunger 229 remains in engagement with the bar 70. In order that the valves may remain open after the nozzle starts to withdraw and while it yet remains in the bottle, means is further provided for locking the valves open after the plunger 229 starts to rise. This may be accomplished by mechanism arranged to engage the bar 70 to hold it down. As shown, for example, pivoted to a bracket 77 is a locking arm 78, the lower end of which is arranged to engage a portion of bar 70 when the latter is in valve opening position. This arm 78 is pressed toward locking position by a spring-pressed dog 79. When the cross piece reaches the lowermost position, the locking arm is caused to swing in so that its end engages the bar 70. Thus, after the plunger 229 starts to rise, the bar is still held down and the valves remain open.

Means is provided for releasing the valve lock and this release may be dependent on the position of the nozzle. As here illustrated as an example, the locking arm 78 has a cam portion 80 at its upper end arranged to be engaged by a wiper pin 81 carried by the cross piece 228 on the nozzle plunger. As the latter rises to withdraw the nozzle, the pin 81 engages the cam 80 and swings the locking arm out of locking position, thus freeing the bar 70 and allowing the valves to close by virtue of their springs. This release is arranged to take place as the nozzle is about to leave the bottle.

It sometimes happens that the nozzle cannot make its full stroke, as for example, when a crowned bottle is presented. Since this would result in the pump pistons making their impelling stroke with the valve 66 closed, provision is made for relieving the excess pressure in the pumps by discharging the charge of liquid in front of the pistons. Although capable of various constructions, in that illustrated in Fig. 8, the bottom of the chamber 29 is in the form of a cylindrical nut 82 having discharge ports 83. These ports are normally closed by a spring pressed relief valve 84 slidable in a sleeve-like cap 85 which is threaded into nut 82. This valve is arranged to open in case the pressure in the pump cylinder increases beyond a predetermined point due, for example, to the pump operating with the passage to the head closed. A similar relief valve 86 is provided for the syrup pump.

Figs. 25 and 26 illustrate a modification arranged to give the necessary relief without loss of liquid. The piston 87 is analogous to piston 21 but it is provided with a chamber 88 opening toward the bottom or discharge end of the cylinder. This passage is formed as shown to provide a seat for a relief valve 89 sliding in sleeve-like nut 90, threaded into the piston, and normally held closed by a spring 91. Leading from chamber 88, at a point above the valve seat, is an oblique duct 92 opening into the pump cylinder behind the piston. With this construction, should the pump operate with the valve 66 closed, the excess pressure opens the relief valve and the liquid in front of the piston flows through the piston to the other portion of the cylinder to be drawn on again.

Since the bottles contain liquid under pressure they are capped while sealed in the filling chamber. The apparatus illustrated is designed to cap the bottles with closures of the crown cork type. Crowns are supplied from a hopper 240 carried by the housing 129 to a delivery chute 241. Associated with the hopper is a crown selecting dial 242 of any suitable construction to select the crowns and deliver them, properly faced, to the chute.

The dial is rotated by means of a hopper shaft 243 driven by a bevel gear 244 meshing with a similar gear 245 on a cross shaft 246. This latter carries a spur gear 247 meshing with a pinion 248 on a shaft 249, which also carries a sprocket 250. The sprocket is driven by a chain 251 which, in turn, is driven by a sprocket 252 on the upper cam shaft 201.

Means is provided for intermittently stopping the flow of crowns so as to deliver one crown at a time, at the same time permitting the delivered crown to have the benefit of the gravity force of the succeeding column of crowns. As here shown, as an example, the lower end of the chute is provided with a slot in which operates an escapement lever 253, pivoted as at 256 and having two crown-engaging projections 257, 258 spaced apart somewhat more than the width of a crown.

Fig. 15 illustrates the position of the apparatus during filling. There is a crown in the head which may be termed the first crown, and the next or second crown is held back by the projection 258 of the escapement lever. The latter member is oscillated by means hereinafter described, and upon its movement to the position of Fig. 14, the second crown is released. For a brief interval the entire column of crowns is free to move so that this released crown receives sufficient push to cause it to slide into the head. Meanwhile the lever movement elevates projection 257 to engage the skirt of the next or third crown in the manner shown in Fig. 14. The reverse movement of the escapement lever permits this third crown to drop into the former position of the second crown ready to be released on the next cycle.

The released crowns slide by means of a chute extension 259 into the filling and capping head through a crown entrance opening. In the head, in the present embodiment the crown is stopped by projections 1 on the abutment ring 205 in such position (Fig. 16) as not to interfere with the filling operation.

Figure 14:
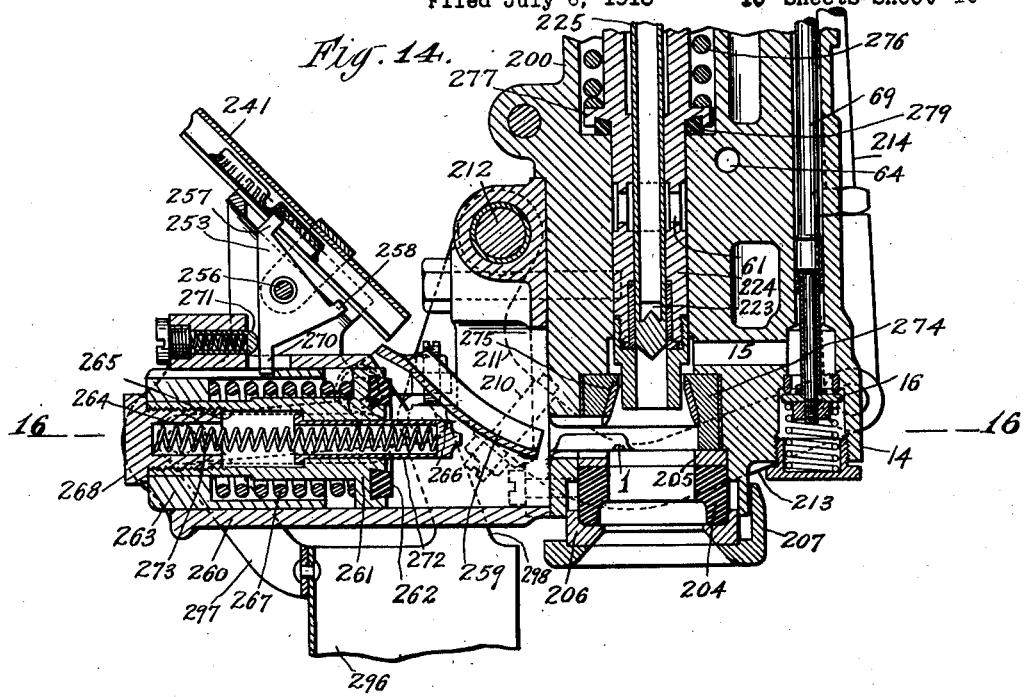
Fig. 14 is a vertical sectional view through the filling and capping head, showing the crown port sealing apparatus in crown feeding position.

Since liquid under pressure is involved, there is provided means for sealing the crown entrance opening during the filling operation, and this sealing means may comprise a gasket pressed against the head by a predetermined force. As here shown, as an example, sliding in a tubular bracket 260 is a sleeve 261 carrying an annular rubber gasket 262 of a size to surround the crown entrance opening. In telescopic relation with this sleeve is a second sleeve 263 also sliding in bracket 260. Compressed between the two shouldered end portions of the two sleeves, as appears in Fig. 14, is a spring 267 which, as will be apparent, tends to separate them. The limit of relative extension is fixed by a nut 268 threaded into the interior of sleeve 261 and arranged to be engaged by the outer edge of sleeve 263. When sleeve 263 is moved inwardly by means to be described, the spring pressing on sleeve 261 will cause the latter to also move forward until the sealing gasket engages the filling head. Thereupon continued movement of sleeve 263, during the remainder of the fixed stroke, causes compression of the spring thereby pressing the gasket tightly about the crown entrance opening. Upon the reverse movement of sleeve 263 the spring is allowed to expand back to normal and as soon as the sleeve 263 engages nut 268, the parts move back to original position as a unit.

Means is provided for reciprocating sleeve 263 and in structures embodying the invention to the best advantage, this movement is accomplished by means of the same mechanism that seals the bottle in the filling head. Although capable of various constructions, as here shown, the sleeve 263 is provided with pins 264 to which are attached links 265 secured by pins 266 to the gasket contracting arms 209.

The chute extension 259 is pivoted so that during the inward movement of the sleeve 261 it is pushed up out of the way, and upon withdrawal of the sleeve it is free to drop back again into normal feeding position.

In the present embodiment the escapement lever 253 is controlled by the movement of sleeve 263. The lever is provided with a heel 270 extending into a slot formed in the sleeve. As the sleeve withdraws and the chute extension drops into feeding position, the end of the slot engages the heel 270 and swings the escapement lever to release the waiting crown. Tending to move the escapement lever in the opposite direction is a spring pressed plunger 271 sliding in a portion of bracket 260. As the sleeve 263 moves forward to free heel 270, the plunger, under the force of the spring, swings back the escapement lever to reverse its position.

Figure 16:
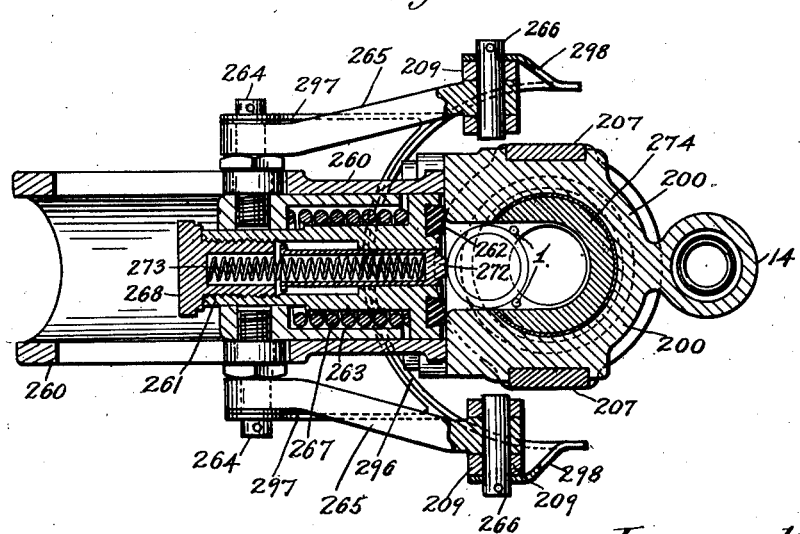
Fig. 16 is a cross-sectional view taken on the line 16—16 of Fig. 14.

It is noted that the filling and capping head is sealed with a crown in the head and means is provided for moving this crown into capping position at the proper time subsequent to the removal of the nozzle. As here shown, carried by the sleeve 261 is a plunger 272 pressed toward the head by a spring 273 which bears against the nut 268. In its normal position this plunger extends outwardly beyond the sealing gasket, so that, as the sealing gasket is moved into sealing position, the plunger is pressed back, thus placing the spring under tension. As shown in Fig. 16, when the parts are in sealing position, the plunger is pressing against the crown in the head, the crown being held in place by the projections on the abutment ring. As before stated, the bottle after filling, is given a further upward movement to bring it into capping position. When this movement takes place, the rim of the bottle engages the waiting crown and tilts it to free it from the projections. This allows the plunger 272 to shoot the crown forward into capping position.

In the filling and capping head is a throat carrier 274 carrying a conical throat ring or capping die 275. Extending into the throat is the capping plunger 224 normally held down by a spring 276 bearing against a shoulder 277 on the plunger and, at the top, against a nut 278 threaded into the head so as to have an adjustable position. The downward movement of the plunger is limited by the engagement of a gasket 279 carried by shoulder 277, with part of the head, as appears in Fig. 8. As the rising bottle bearing the loose cap engages the plunger, the latter is forced back against its spring and the closing of the spring definitely stops the plunger and consequently limits the extent to which the bottle may enter the throat. After this limit is reached, the bottle cannot rise further, and further upward movement of the elevating device is compensated for by the yielding of the bottle elevating table as before described, the amount of compensation depending on the height of the bottle. By this construction a uniform pressure is applied to the successive bottles. This pressure provides the necessary sealing contact between cap and bottle and the cap skirt is crimped about the bottle by the capping die in the manner well known in the art.

After the bottle is capped the elevating mechanism makes its return stroke thus withdrawing the bottle from the head and the feeding dial carries it to a point where it can be removed and an empty bottle substituted.

As has been described, bottles are moved one by one into a position beneath the filling and capping head. There is provided means for causing the filling apparatus and the hopper mechanism to be inactive in case no bottle is presented. This may be accomplished, for example, by having the upper cam shaft driven by a clutch mechanism which is controlled by the presence of a bottle in filling position. As here shown, the worm wheel 203, which is driven by a worm 203' on the vertical shaft 124, is freely rotatable on the hub of the gasket operating cam 220. Keyed to the cam shaft 201 is a clutch member 283 which carries a sliding bolt 284 adapted to be engaged by a block 285 secured to the worm wheel 203. In case the sliding bolt 284 is in a position to be engaged by the block 285, the clutch member will be rotated, thereby driving the cam shaft. The sliding bolt 284 is normally in driving position and means is provided for withdrawing the bolt in case no bottle is presented. This withdrawing means is so arranged as to normally be in position to withdraw the bolt and to be rendered inoperative by the presence of a bottle. Extending out from the bottle table 155 is a lever 286 pinned to a tubular member 287, this connection being adjustable. Having a slidable connection with the tubular member 287 is a vertical rod 288 at the upper end of which is pinned a lever 289, the yoked end of which is secured to a crossbar 290 which carries a wiper 291. In order to hold the wiper in normal position and to return it thereto, it is secured to a lever 292 pivoted as at 293 and controlled by a spring pressed member 294. The wiper is normally in a position to engage a projection on the clutch bolt to withdraw the latter. When, however, a bottle is presented, its movement into filling position displaces lever 286, thus withdrawing, through the connections described, the wiper to such position that it does not operate to withdraw the clutch bolt, and the cam shaft is rotated. If no bottle is presented, lever 286 is not displaced and the wiper withdraws the clutch bolt and renders the cam shaft inactive. It is noted that four of the major mechanisms, as well as the hopper shaft are driven by this cam shaft 201. With the construction described, should the operator, for example, cease feeding bottles without stopping the machine, only the bottle feed and bottle elevating mechanisms would operate. Thus there would be no loss of liquid, wear would be prevented and there would be no unnecessary churning of the crowns in the hopper.

Provision is made for protecting the operator from flying glass in case a bottle should burst during filling. This may be accomplished by a guard plate readily attachable to some portion of the apparatus in a manner to be moved into position and withdrawn therefrom for each bottle presented. Although capable of various constructions, in the form shown, there is provided an arcuate guard plate 296 having two sets of arms 297, 298, which are somewhat flexible. The guard plate is attached to the gasket sealing mechanism to be reciprocated thereby. To this end, the arms have holes fitting over pins 264 and 266. The guard is attached by springing the arms apart and slipping them onto the pins and it is readily removed. When the sleeve 263 moves in toward the head the guard plate moves into bottle embracing position, and when the sleeve moves back the guard is withdrawn from the path of the moving bottles during the feeding stroke. Thus an effective guard is provided without any extraneous mechanism.

There is provided a nozzle having associated therewith means for closing the nozzle at or near its mouth. This may be accomplished by a valve arranged to be normally closed, and means for holding the valve open and releasing the same in accordance with the position of the nozzle. As shown, as an example, in Fig. 27, the nozzle tube 351 is analogous to and is operated in the same way as the nozzle tube 225 already described. The mouth of this tube 351 forms a seat for a conical valve member 352 which closes the mouth of the nozzle when on its seat. The valve is secured to a rod 353 which slides in a two part plunger 354, which carries the nozzle tube. The valve is normally held closed by a spring 356 located in a central bore in the plunger 354 and bearing against the latter at one end and against a sleeve 357 on the valve rod, at the other end. To actuate the valve rod to open the valve, the rod is connected to a guide nut 355 engaged by one arm of a trigger or lever 358 pivoted in the head of plunger 354. In the path of the outer arm of this lever is a stationary lug 359 on the water pump. As the nozzle descends to filling position, the lever engages the lug and is moved to the position shown in dotted lines. This causes depression of the valve rod and the valve opens to permit flow. When the nozzle starts to rise and the lever goes out of engagement with lug 359, the valve rod returns to its former position under the force of its spring, thus closing the valve and cutting off the flow. Such a construction effects a saving of liquid, as the liquid remaining in the nozzle tube after the bottle is filled, is retained by the nozzle valve.

Provision is also made for utilizing a stream of the umbrella type in a manner to permit an unimpeded outflow of the displaced air. It will be seen that with a nozzle of the type just described, the conical head causes the liquid to flow from the tube in an umbrella-shaped stream.

The valve carries a guide member comprising a sleeve portion 360 sliding in the nozzle tube and two vertical ribs 361 connecting the sleeve with the valve head. These ribs break the umbrella stream in two sectors, as appears in Fig. 28, and the displaced air has unimpeded exit through these breaks.

Fig. 29 illustrates a further modification of the nozzle, this form being particularly adaptable to use with long-necked bottles. The nozzle tube 365 has at its lower end a mouth piece 366 constricted as at 367 to form a seat for a valve member 368. Below the valve seat the mouth piece 366 has a cross passage 369 and below the latter is a conical head 370 for spreading the stream. The valve member 368 is secured to a valve rod 371 sliding in the plunger 372 which carries the nozzle tube. This plunger is also centrally bored to receive a spring 373 for normally holding the valve closed. To this end, the spring bears at the bottom against a plunger 374, to which the valve rod is connected, and at the top against a nut 375. The plunger 374 carries a head 376 which is engaged from below by a lever 377 pivoted in the head of the nozzle plunger. The end of this lever is arranged to engage the lug 359 as the nozzle descends. When this engagement takes place the lever raises the valve rod and thus lifts the valve from its seat. As the nozzle rises again, the valve returns to its seat under the force of its spring.

The conical head 370 has a central bore 378 opening into the cross passage 369. During the filling operation the liquid flows through the open valve, around the cross passage 369 and out into the bottle in an umbrella-shaped stream. The displaced air flows up through the central bore 378, and out through the cross passage 369 into the bottle again at a point above the emerging stream.

The details of operation of the machine will be clear from the foregoing description. To review, however, the operation as a whole, the head being positioned by means of the handle 135 at the height suitable for the bottles being filled, the clutch is thrown in by means of the starting lever 110. This causes rotation of the lower cam group and the vertical shaft 124. Empty bottles are placed in the bushings of the bottle dial which moves them one by one to the elevating table 180 beneath the capping head. Rotation of cam 142 causes the elevating mechanism to raise the bottle thereon to filling position in the filling head. The movement of the bottle into position beneath the filling head having actuated lever 286 to withdraw wiper 291, the upper cam shaft 201 will be rotated by its clutch connection with worm wheel 203. After the bottle has been raised to filling position the following operations occur substantially simultaneously: The arms 209 cause the gasket 204 to be contracted to seal the bottle in the head; the sleeve 263 moves forward and allows the escapement lever to move under force of spring pressed plunger 271 to release the leading crown which slides into the head; the further movement of sleeve 263 causes the gasket 262 to be pressed in sealing position about the crown entrance; and the guard plate moves into bottle embracing position.

The filling nozzle descends into the bottle and, as it approaches the end of its stroke, its operating plunger 229 engages the bar 70 and displaces the same, thus causing first, the opening of the gas control valve to admit the bottle to the pressure line, thus setting up counterpressure in the bottle and secondly, the opening of the liquid control valve. The water piston makes the major portion of its stroke, thus forcing the major portion of the water charge into the bottle. It then pauses while the syrup piston makes its impelling stroke, thus delivering the syrup charge to the bottle. The water piston then completes its stroke, the remainder of the water charge serving to wash out any syrup in the common passage and nozzle. The displaced air and gas pass to the upper part of the reservoir tank, where any excess is vented when the float drops to a given position. As the nozzle rises the pin 81 engages cam 80 and unlocks the gas and liquid control valves which close under the force of their springs. The bottle is further raised to capping position and the waiting crown is affixed as described. The arms 209 swing back, thus releasing the two sealing gaskets and withdrawing the guard plate from the bottle path, and the bottle is lowered to the level of the stationary table. Meanwhile the two pump pistons have made their suction strokes thus drawing from the source of supply a further charge. Also during the above described operations, the lever 162 has drawn back the driving pawl 161, the ratchet lock being released during this back stroke of lever 162. The pawl is now driven forward to move the dial 157 one stroke, which simultaneously removes the filled and capped bottle and places the next empty bottle into position for the next cycle.

It is to be understood that while the terms "bottle" and "crown" have been used to designate the receptacle and closure, the invention is not restricted to any particular form of receptacle or closure. It is further noted that although the apparatus shown is a soda machine, certain features of the invention are applicable to packaging apparatus in general and are not confined to machines for filling bottles with syrup and carbonated water.

What is claimed is:

1. In packaging apparatus, and in combination, a filling head, a bottle support, means for causing successive relative movements between the head and support to assemble the head and successive bottles in filling relation, container means, having a connection with the head, for a supply of carbonated liquid, means for establishing a substantitl counterpressure in the bottles to be filled, and mechanically operated means for positively forcing uniform charges of said liquid into the successive bottles.

2. In apparatus for packaging carbonated liquids, and in combination, a filling head, a bottle support, means for causing successive relative movements between the head and support to assemble the head and successive bottles in filling relation, container means, a carbonator, a connection for supplying carbonated liquid from the carbonator to said container means, a connection between the container means and the head, means whereby a substantial counterpressure may be set up in the bottles, and mechanically operated means for positively forcing uniform charges of said liquid into the successive bottles.

3. In a packaging machine, and in combination, a filling head, a bottle support, a drive shaft, means, including an operating connection with said shaft, for causing relative movement between head and support to assemble the head and a bottle in filling relation, means for establishing a substantial counterpressure in the bottle, container means, having a connection with the head, for a supply of carbonated liquid, a pump associated with said connection, and means, including a connection from said drive shaft, for operating said pump with a given stroke.

4. In apparatus for packaging carbonated liquids, and in combination, a filling head, means for sealing a bottle in filling relation therewith, a carbonator for supplying carbonated liquid, a reducer valve associated therewith, a connection for delivering gas freed by the reducer valve to the sealed bottle thereby to establish therein a substantial counterpressure, a connection for delivering the carbonated liquid to the sealed bottle, a pump in said last named connection, and mechanically operated means for operating said pump with a given stroke.

5. In a packaging machine, and in combination, a filling head, means for sealing a bottle in filling relation therewith, container means for carbonated liquid and gas and air, a connection for the passage of the liquid from the container means to the sealed bottle, a pump associated with said connection for impelling the liquid, a connection for the passage of gas and air between the container means and the bottle, and mechanically operated means for operating said pump with a given stroke.

6. In packaging apparatus, in combination with a source of carbonated liquid, means for establishing in the bottle to be filled a substantial counterpressure, liquid impelling means comprising a cylinder having connections with the source of supply and the bottle, and a piston, oscillating mechanism for reciprocating said piston, and means for adjusting the driving stroke of said mechanism.

7. In packaging apparatus, in combination with a source of carbonated liquid, means for establishing in the bottle to be filled a substantial counterpressure, liquid impelling means comprising a cylinder having connections with the source of supply, and the bottle, and a piston, a rocker lever for reciprocating said piston, a cam roller on said lever, a cam on which said roller rides, and means for rotating said cam.

8. In packaging apparatus, in combination with a source of carbonated liquid, means for establishing in the bottle to be filled a substantial counterpressure, liquid impelling means comprising a cylinder having connections with the source of supply and the bottle, and a piston, a rocker lever for reciprocating said piston, a cam roller on said lever, a cam on which said roller rides, means for rotating said cam, and means for shifting the pivot on which said lever rocks, thereby to vary the driving stroke thereof.

9. In packaging apparatus, in combination with a source of carbonated liquid, means for establishing in the bottle to be filled a substantial counterpressure, liquid impelling means comprising a cylinder having connections with the source of supply and the bottle, and a piston, means for adjusting the stroke of said piston, indicating mechanism, and means for operating said indicating mechanism in accordance with the adjustment of the piston stroke.

10. In packaging apparatus, in combination with a source of carbonated liquid, means for establishing in the bottle to be filled a substantial counterpressure, liquid impelling means comprising a cylinder having connections with the source of supply and the bottle, and a piston, a rocker lever for reciprocating said piston, a cam roller on said lever, a cam on which said roller rides, means for rotating said cam, means for shifting the pivot on which said lever rocks, thereby to vary the driving stroke thereof, indicating mechanism, and means for operating said indicating mechanism in accordance with the shifting of said pivot.

11. In packaging apparatus, in combination with a source of carbonated liquid, means for establishing in the bottle to be filled a substantial counterpressure, liquid impelling means comprising a cylinder having connections with the source of supply and the bottle, and a piston, a rocker lever for reciprocating said piston, a cam roller on said lever, a cam on which said roller rides, means for rotating said cam, means for shifting the pivot on which said lever rocks, thereby to vary the driving stroke thereof, a pointer, an indicating dial, and means for moving said pointer in accordance with the movement of said pivot.

12. In packaging apparatus, in combination with a delivery nozzle having connection with a source of carbonated liquid and a source of syrup, means for first causing delivery of the major portion of the liquid charge and after a delay the remainder of the liquid charge, and means for causing the delivery of the syrup charge during such delay.

13. In packaging apparatus, in combination with a source of carbonated liquid, means for establishing in the bottle to be filled a substantial counterpressure, liquid impelling means comprising a cylinder having connections with the source of supply and the bottle, and a piston, and means for reciprocating said piston with a stroke of given length and at a varying speed relatively slower at the end than at the start.

14. In packaging apparatus, in combination with a source of carbonated liquid, means for establishing in the bottle to be filled a substantial counterpressure, liquid impelling means comprising a cylinder having connections with the source of supply and the bottle, and a piston, and means for reciprocating said piston with a stroke of given length and at a gradually diminishing speed.

15. In packaging apparatus, in combination with a source of carbonated liquid, means for establishing in the bottle to be filled a substantial counterpressure, liquid impelling means comprising a cylinder having a connection with the source of supply and a piston, a nozzle for delivering liquid to the bottle, a connection between said cylinder and the nozzle, a valve for normally closing said connection, and positively operated means for opening said valve.

16. In a packaging apparatus, in combination with a source of carbonated liquid, means for establishing in the bottle to be filled a substantial counterpressure, liquid impelling means comprising a cylinder having a connection with the source of supply, and a piston, a nozzle movable with relation to the bottle, a connection between said cylinder and said nozzle, a valve for normally closing said connection, and means dependent on the position of the nozzle for opening said valve.

17. In packaging apparatus, in combination with a source of carbonated liquid, means for establishing in the bottle to be filled, a substantial counterpressure, liquid impelling means comprising a cylinder having a connection with the source of supply, and a piston, a nozzle movable with relation to the bottle, a connection between said cylinder and said nozzle, a valve for normally closing said connection, means dependent on the position of the nozzle for opening said valve, and means for locking the valve in its open position.

18. In packaging apparatus, in combination with a source of carbonated liquid, means for esablishing in the bottle to be filled a substantial counterpressure, liquid impelling means comprising a cylinder having a connection with the source of supply, and a piston, a nozzle movable with relation to the bottle, a connection between said cylinder and said nozzle, a valve for normally closing said connection, means dependent on the position of the nozzle for opening said valve, means for locking the valve open, and means dependent on the position of the nozzle for releasing said locking means.

19. In packaging apparatus in combination with a source of carbonated liquid, means for establishing in the bottle to be filled a substantial counterpressure, liquid impelling means comprising a cylinder having a connection with the source of supply, and a piston, a nozzle, a plunger for lowering and raising said nozzle to and from the bottle, a connection between said cylinder and said nozzle, a valve for normally closing said connection, a rod secured to said valve, a member engaged by said plunger on its nozzle-lowering stroke for actuating said rod to open the valve and to hold it open during such engagement, means for locking the valve open after said plunger rises out of engagement with said member, and means dependent on the position of the nozzle for releasing said locking means.

20. In packaging apparatus, in combination with a source of carbonated liquid and a source of syrup, a filling head, means for sealing the bottle to be filled in said head, means for establishing in the bottle a substantial counterpressure, a nozzle movable with relation to the bottle, a cylindrical member in which said nozzle reciprocates, a chamber in said cylindrical member, a passage opening into said chamber, liquid impelling means for both carbonated liquid and syrup comprising cylinders having connections with the respective sources of supply, and pistons, and connections between each of said cylinders and said passage.

21. In packaging apparatus, in combination with a source of carbonated liquid and a source of syrup, a fillng head, means for sealing the bottle to be filled in said head, means for establishing in the bottle a substantial counterpressure, a nozzle movable with relation to the bottle, a cylindrical member in which said nozzle reciprocates, a chamber in said cylindrical member, a passage opening into said chamber and leading from a valve chest, liquid impelling means for the carbonated liquid and syrup comprising cylinders each having connections with its respective source of supply and said valve chest, a normally closed valve in said valve chest for controlling said passage, and positively operated means for opening said valve.

22. In packaging apparatus, and in combination, a filling head, means for feeding bottles to filling position, a sealing gasket for sealing the bottle in said head, a nozzle, mechanism for causing the delivery of a charge of carbonated liquid, mechanism for causing the delivery of a charge of syrup, mechanism for operating said gasket, mechanism for reciprocating said nozzle, means for operating said four mechanisms, and means for causing said operating means to remain inactive when a bottle is not presented to filling position.

23. In packaging apparatus, and in combination, a filling head, a sealing gasket for sealing the bottle to be filled in said head, a nozzle, mechanism for causing the delivery of a charge of carbonated liquid, mechanism for causing the delivery of a charge of syrup, mechanism for operating said gasket, mechanism for reciprocating said nozzle, a shaft for operating said four mechanisms, a hopper shaft, means also operated by said shaft for driving said hopper shaft, and means controlled by the movement of a bottle into feeding position for driving said shaft.

24. In packaging apparatus, and in combination, a filling head, a sealing gasket for sealing the bottle to be filled in said head, a nozzle, mechanism for causing the delivery of a charge of carbonated liquid, mechanism for causing the delivery of a charge of syrup, mechanism for operating said gasket, mechanism for reciprocating said nozzle, a shaft for operating said four mechanisms, a hopper shaft, means also operated by said shaft for driving said hopper shaft, means for driving said shaft, means tending to cause said shaft to be inactive, and means actuated by the movement of a bottle into filling position for causing said last named means to be inoperative.

25. In packaging apparatus, and in combination, a filling head having a closure entrance port, a gasket for sealing said port, a sleeve-like member carrying said gasket, a second sleeve-like member in telescopic relation with said member, a spring between said members tending to separate them, means for limiting such separation, and means for reciprocating said second sleeve-like member with a fixed stroke.

26. In packaging apparatus, and in combination, a filling head, means for feeding bottles to the filling head, liquid impelling means for forcing liquid into the bottles, a shaft for operating said impelling means, driving means for said shaft, a clutch connection between the shaft and said driving means, means tending to withdraw said clutch connection, a lever in the path of the bottles taking filling position, and a connection between said lever and said withdrawing means for rendering the latter inoperative upon actuation of said lever by a bottle, whereby the clutch is connected, when a bottle takes filling position.

27. In packaging apparatus, in combination with a source of carbonated liquid, means for establishing in the bottle to be filled a substantial counterpressure, liquid impelling means comprising a cylinder having a connection with the source of supply, and a piston, a nozzle having relative movement with respect to the bottle to be filled, a connection between said cylinder and said nozzle, a valve for normally closing said connection, and means dependent on the relative position of the nozzle with respect to the bottle for opening said valve.

28. In packaging apparatus, in combination with a source of carbonated liquid, means for establishing in the bottle to be filled a substantial counterpressure, liquid impelling means comprising a cylinder having a connection with the source of supply, and a piston, a nozzle having relative movement with respect to the bottle to be filled, a connection between said cylinder and said nozzle, a valve for normally closing said connection, and means dependent on the relative position of the nozzle with respect to the bottle for opening said valve and for holding it open until said relative position is changed.

29. In packaging apparatus, and in com-combination, a filling head, liquid pumping means comprising a cylinder and a piston, a connection between the cylinder and the filling head, a valve for said connection, means normally opening said valve for each bottle presented, means whereby the valve remains closed if no bottle is presented, and a loaded relief valve in said piston.

30. In packaging apparatus, and in combination, a bottle feeding dial having a plurality of bottle receiving pockets associated therewith, a ratchet for moving said dial, a shaft on which said ratchet is mounted, a pawl carrier, a drive pawl carried thereby, a supporting arm for the pawl carrier hung on said shaft, a pawl for preventing backward movement of the ratchet, another pawl for locking the ratchet against forward movement, a wiper connected with said supporting arm for disengaging said last-named pawl upon the back stroke of the pawl carrier, and means for reciprocating the pawl carrier.

31. In apparatus for packaging carbonated liquids, and in combination, a filling head, means for sealing a bottle therein, a reservoir, a carbonator, a reducing valve associated therewith, a connection for delivering the liquid and freed gas from the reducing valve to the reservoir, a liquid connection from the reservoir to the filling head, liquid impelling means included in said connection for forcing the liquid into the bottle and a second connection between the filling head and the reservoir for establishing counterpressure in the bottles and for the escape of the displaced air, said reservoir and said connections constituting a balanced pressure line of which the bottle is made a part.

32. In apparatus for packaging carbonated liquids, and in combination, a filling head, means for sealing a bottle therein, a reservoir, a supply pipe for supplying carbonated liquid to the reservoir, a liquid connection including a pump chamber between the reservoir and the filling head, a second connection between the filling head and the reservoir for establishing counterpressure in the bottles and for the escape of the displaced air, said reservoir and said connections constituting a balanced pressure line of which the bottle is made a part, a pump piston in said cylinder, and means for operating said pump piston with a given stroke.

33. In a packaging machine, and in combination, container means for a supply of carbonated liquid, a connection, including a pump cylinder, for connecting the bottle to be filled with said container means, means for establishing in the bottle a substantial counterpressure, a pump piston in said cylinder, and mechanically operated means for reciprocating said piston to fill a single bottle at each successive stroke.

34. In a packaging apparatus, in combination, means for establishing in the bottle to be filled a substantial counterpressure, a chamber having an inlet for connection with a source of carbonated liquid supply, and liquid impelling means associated with said chamber, a nozzle having connection with said chamber, a valve for normally closing said last named connection, and positively operated means for opening said valve.

35. In packaging apparatus, in combination, means for establishing in the bottle to be filled, a substantial counterpressure, a chamber having an inlet for connection with a source of carbonated liquid supply, and liquid impelling means associated with said chamber, a nozzle having relative movement with respect to the bottle to be filled, a connection between said nozzle and said chamber, a valve for normally closing said last named connection, and means dependent on the relative position of the nozzle with respect to the bottle for opening said valve.

36. In packaging apparatus, in combination, a filling head, a sealing gasket for sealing the bottle in said head, a liquid impelling element, mechanism for causing operation of said sealing gasket, mechanism for operating said impelling element, means for operating said two mechanisms, and means for causing said operating means to remain inactive when a bottle is not presented to filling position.

37. In packaging apparatus, and in combination, a rotary bottle centering dial having a plurality of bottle receiving pockets, a ratchet operatively connected with said dial, a shaft on which said ratchet is mounted, a pawl carrier hung on said shaft, a drive pawl carried thereby, a pawl for preventing backward movement of the ratchet, another pawl for locking the ratchet against forward movement, a wiper connected with said supporting arm for disengaging said last-named pawl upon the back stroke of the pawl carrier, means for reciprocating said pawl carrier, a drive shaft, a connection between said drive shaft and said reciprocating means, a packaging head, and means for causing relative movement between said head and the bottle operated by said drive shaft.

38. In packaging apparatus, in combination with a filling head, means for sealing a bottle therein, a reservoir having an inlet for connection with a carbonator, a reducer valve between the carbonator and the reservoir, a liquid connection between the reservoir and the bottle, a gas-and-air connection between the reservoir and the bottle, and a liquid impelling means in said liquid connection for forcing liquid into the bottle.

39. In packaging apparatus, in combination with a filling head, means for sealing a bottle therein, a reservoir normally closed to atmosphere and having an inlet for connection with a carbonator, a reducer valve between the carbonator and the reservoir, a liquid connection between the reservoir and the bottle, a gas-and-air connection between the reservoir and the bottle, a liquid impelling means in said liquid connection for forcing liquid into the bottle, and a vent valve, associated with said reservoir, the operation of which is dependent on the amount of air and/or free gas trapped in the reservoir.

40. In packaging apparatus, and in combination, a filling head, means for sealing a bottle therein, a nozzle associated with the head and having relative movement with respect to the bottle, liquid impelling means comprising a cylinder having a connection for communication with a source of carbonated liquid and a connection with the nozzle, and a piston, means for establishing a counterpressure in the bottle, a valve in the connection between the pump cylinder and the bottle, for normally closing the same, and means dependent on the relative position of the nozzle with respect to the bottle for opening said valve.

41. In packaging apparatus, and in combination, a filling head, means for sealing a bottle therein, a reservoir for carbonated liquid, a nozzle having relative movement with respect to the bottle, a connection between the reservoir and the nozzle, liquid impelling means associated with said connection for forcing liquid into the bottle, a valve in said connection, and means dependent on the relative position of the nozzle for opening said valve.

42. In packaging apparatus, and in combination, means for establishing in the bottle to be filled a substantial counterpressure, a chamber having an inlet for connection with a source of carbonated liquid supply, liquid impelling means associated with said chamber, a nozzle having relative movement with respect to the bottle to be filled, a connection between said nozzle and said chamber, a valve for normally closing said connection, and means dependent on the relative position of the nozzle for opening said valve and holding it open.

43. In packaging apparatus, and in combination, a filling head, means for sealing a bottle therein, a reservoir, a carbonator, a reducing valve associated therewith, a connection for delivering the carbonated liquid and freed gas to the reservoir, a liquid connection from the reservoir to the filling head, a second connection between the filling head and the reservoir for establishing counterpressure in the bottles and for the escape of the displaced air, said reservoir and connections constituting a pressure line of which the bottle is made a part, and impelling means for forcing the liquid into the bottles.

44. In packaging apparatus, and in combination, a receptacle, a carbonator, a reducing valve between the receptacle and carbonator, a connection for supplying carbonated liquid and freed gas to the receptacle, a connection between the receptacle and the bottle to be filled, impelling means for forcing the liquid from the receptacle into the bottle, and a discharge passage for displaced air and freed gas leading from the bottle.

45. In a packaging apparatus, and in combination, a filling head, a bottle support, means for causing relative movement between the head and support to assemble the head and a bottle in filling relation, container means for a supply of carbonated liquid and free gas, a connection for the passage of liquid from said container means to the head, a pump in said connection, a connection between said cointainer means and the head for the passage of gas and air, and means operating in synchronism with said assembling means for operating said pump with a given stroke.

46. In a packaging apparatus, and in combination, a filling head, a bottle support, means for causing relative movement between the head and support to assemble the head and a bottle in filling relation, container means for a supply of carbonated liquid and free gas, a connection for the passage of liquid from said container means to the head, a pump in said connection, a connection between said container means and the head for the passage of gas and air, valve means for controlling said connections, means for automatically operating said valve means, and means operating in synchronism with said assembling means for operating said pump with a given stroke.

47. In a packaging apparatus, and in combination, a filling head, a bottle support, means for causing relative movement between the head and support to assemble the head and a bottle in filling relation, container means for a supply of carbonated liquid and free gas, a connection for the passage of liquid from said container means to the head, a pump in said connection, a connection between said container means and the head for the passage of gas and air, valve means for controlling said connections, means for automatically operating said valve means first to open the connection for the free gas and thereafter to open the connection for the liquid, and means operating in synchronism with said assembling means for operating said pump with a given stroke.

48. In a packaging apparatus, and in combination, a filling head, a bottle support, means for causing relative movement between the head and support to assemble the head and a bottle in filling relation, a tank having a connection for receiving carbonated liquid and free gas, a connection between the tank and the head for the passage of the liquid, a pump in said connection, a connection between the upper part of said tank and the head for the passage of free gas and air, and means operating in synchronism with said assembling means for operating said pump with a given stroke.

49. In a packaging apparatus, and in combination, a filling head, a bottle support, means for causing relative movement between the head and support to assemble the head and a bottle in filling relation, a carbonator, a tank, a connection between said carbonator and the tank, a reducer valve in said connection, a connection between the tank and the head for the passage of carbonated liquid, a pump in said last named connection, a connection between the tank and the head for the passage of free gas and air, and means operating in synchronism with said assembling means for operating said pump with a given stroke.

50. In a packaging apparatus, and in combination, a filling head, a bottle support, means for causing relative movement between the head and support to assemble the head and a bottle in filling relation, container means for a supply of liquid and free gas, a connection between the container means and the head for the passage of liquid, a pump in said connection, a connection between the container means and the head for the passage of gas and air, means operating in synchronism with said assembling means for operating said pump with a given stroke, a vent valve in said container means for venting gas and air, and automatic means for operating said vent valve.

51. In a packaging apparatus, and in combination, a filling head, a bottle support, means for causing relative movement between the head and support to assemble the head and a bottle in filling relation, a tank having a connection with a source of carbonated liquid, a connection between the tank and the head for the passage of liquid, a pump in said connection, a connection between the upper part of the tank and the head for the passage of gas and air, means operating in synchronism with said assembling means for operating said pump with a given stroke, and a float controlled vent valve in said tank.

52. In a packaging apparatus, and in combination, a filling head, a bottle support, means for causing relative movement between the head and support to assemble the head and a bottle in filling relation, a tank, a carbonator, a connection between the tank and the carbonator, a reducer valve in said connection, a connection between the tank and the head for the passage of carbonated liquid, a pump in said last named connection, a connection between the tank and the head for the passage of gas and air, means operating in synchronism with said assembling means for operating said pump with a given stroke, and a float controlled vent valve in said tank.

53. In a packaging apparatus, and in combination, a filling head, a bottle support, a nozzle carried by the head and having movement relative thereto, a container for a supply of carbonated liquid, a connection, including a pump, between said container and said nozzle, for the passage of liquid to the nozzle, a valve between the pump and the nozzle, means for operating the pump with a given stroke, automatic means operating in synchronism with the pumping means for operating said valve, valve means associated with the nozzle near the outlet thereof, and means dependent on the relative position of the nozzle for operating said valve means.

54. In a packaging machine, and in combination, a filling head, means for sealing a bottle in filling relation therewith, container means for carbonated liquid and gas and air, a connection for the passage of the liquid from the container means to the sealed bottle, a pump in said connection, a connection for the passage of gas and air between the bottle and the container means, valve means for controlling said connections, a drive shaft, means, including an operating connection from the drive shaft, for operating said pump with a given stroke, and means, including an operating connection from the drive shaft, for operating said valve means.

55. In a packaging machine, and in combination, a filling head, means for sealing a bottle in filling relation therewith, container means for carbonated liquid and gas and air a connection for the passage of gas and air between said container means and the bottle to establish a counterpressure therein, a connection for the passage of the liquid from the container means to the bottle, a pump in said last named connection, valve means controlling said connections, a drive shaft, means, including a connection from said drive shaft, for operating said valve means first to open the first named connection and thereafter to open the second named connection, and means, including a connection from said drive shaft, for operating said pump with a given stroke.

56. In a packaging machine, and in combination, a filling head, means for sealing a bottle in filling relation therewith, a tank for containing carbonated liquid and gas and air, a connection between the lower part of the tank and the head for the passage of liquid to the sealed bottle, a connection between the upper part of the tank and the head for the passage of gas and air between the tank and the bottle, a pump in said first named connection and mechanically operated means for operating said pump with a given stroke.

57. In a packaging machine, and in combination, a filling head, means for sealing a bottle in filling relation therewith, container means for carbonated liquid and gas and air, a connection for the passage of the liquid from the container means to the sealed bottle, a pump associated with said connection for impelling the liquid, a connection for the passage of gas and air between the container means and the bottle, mechanically operated means for operating said pump with a given stroke, and valve means for automatically venting said container means of its gas and air.

58. In a packaging machine, and in combination, a filling head, means for sealing a bottle in filling relation therewith, a tank for containing carbonated liquid and gas and air, a connection between the lower part of the tank and the head for the passage of liquid to the sealed bottle, a connection between the upper part of the tank and the head for the passage of gas and air between the tank and the bottle, a pump in said first named connection, mechanically operated means for operating said pump with a given stroke, a valve in the upper part of said tank for venting gas and air to atmosphere, and means for automatically operating said valve.

59. In apparatus for packaging carbonated liquids, and in combination, a filling head, means for supporting a bottle in filling relation therewith, a tank normally closed to the atmosphere, a carbonator, a connection between the tank and the carbonator, a reducer valve in said connection whereby carbonated liquid and free gas are delivered to the tank, a connection between the lower part of the tank and the head, a pump in said connection, a connection between the upper part of the tank and the head for the passage of free gas and air, automatic means for operating said pump whereby liquid is drawn from the tank and forced into the bottle, thereby driving free gas and air in the bottle into the tank, whereby the flow from the carbonator and reducer valve is controlled by the relative pressure of the air and gas in the tank, and a float controlled vent valve to vent gas and air when the liquid level drops to a predetermined point.

60. In a packaging machine, and in combination, a packaging head, means for supporting a bottle in filling relation therewith, means for setting up a substantial counterpressure in the bottle, means for supplying carbonated liquid to the head, including a pump, mechanically operated means for operating said pump with a given stroke, and means whereby the stroke of the pump may be adjusted.

In testimony whereof, I have hereunto set my hand.

GEORGE J. HUNTLEY.